US010990950B2

(12) United States Patent
Garner et al.

(10) Patent No.: US 10,990,950 B2
(45) Date of Patent: Apr. 27, 2021

(54) SYSTEMS AND METHODS OF PRODUCT RECOGNITION THROUGH MULTI-MODEL IMAGE PROCESSING

(71) Applicant: Walmart Apollo, LLC, Bentonville, AR (US)

(72) Inventors: Michael A. Garner, Centerton, AR (US); Priyanka Paliwal, Grapevine, TX (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/800,370

(22) Filed: Feb. 25, 2020

(65) Prior Publication Data

US 2020/0272856 A1 Aug. 27, 2020

Related U.S. Application Data

(60) Provisional application No. 62/809,851, filed on Feb. 25, 2019, provisional application No. 62/840,748, filed on Apr. 30, 2019.

(51) Int. Cl.
*G06K 9/00* (2006.01)
*G06Q 20/20* (2012.01)
(Continued)

(52) U.S. Cl.
CPC ......... *G06Q 20/208* (2013.01); *G06F 16/535* (2019.01); *G06K 9/00671* (2013.01);
(Continued)

(58) Field of Classification Search
CPC .... G06Q 20/208; G06Q 10/087; G06Q 20/12; G06Q 20/201; G06Q 20/42;
(Continued)

(56) References Cited

U.S. PATENT DOCUMENTS 6,676,014 B2 1/2004 Catan
9,646,286 B2 * 5/2017 Brelig ................ G06Q 10/0875
(Continued)

FOREIGN PATENT DOCUMENTS

CA 2923600 A1 * 9/2016 ............. G06F 40/30
WO WO-2016077934 A1 * 5/2016 ....... G06K 19/06037
WO WO-2019102072 A1 * 5/2019 ........... G06N 3/0454

OTHER PUBLICATIONS

Clarifai; "Introducing New Android SDK—Join Our Private Beta Program"; https://www.clarifai.com/get-sdk; Available at least as early as Feb. 11, 2019; pp. 1-2.
(Continued)

*Primary Examiner* — Mahendra R Patel
(74) *Attorney, Agent, or Firm* — Fitch, Even, Tabin & Flannery LLP

(57) ABSTRACT

In some embodiments, systems and methods are provided to recognize retail products, comprising: a model training system configured to: identify a customer; access an associated customer profile; access and apply a set of filtering rules to a product database based on customer data; generate a listing of products specific to the customer; access and apply a model training set of rules to train a machine learning model based on the listing of products and corresponding image data for each of the products in the listing of products; and communicate the trained model to the portable user device associated with first customer.

22 Claims, 14 Drawing Sheets

(51) Int. Cl.
*G06K 9/32* (2006.01)
*G06N 20/00* (2019.01)
*G06F 16/535* (2019.01)
*G06K 9/62* (2006.01)
*G06N 5/04* (2006.01)
*G06Q 10/08* (2012.01)
*G06Q 20/12* (2012.01)
*G06Q 20/42* (2012.01)
*G06Q 30/06* (2012.01)

(52) U.S. Cl.
CPC ......... *G06K 9/00765* (2013.01); *G06K 9/325* (2013.01); *G06K 9/3241* (2013.01); *G06K 9/6257* (2013.01); *G06N 5/04* (2013.01); *G06N 20/00* (2019.01); *G06Q 10/087* (2013.01); *G06Q 20/12* (2013.01); *G06Q 20/201* (2013.01); *G06Q 20/42* (2013.01); *G06Q 30/0623* (2013.01); *G06Q 30/0633* (2013.01)

(58) Field of Classification Search
CPC ........... G06Q 30/0623; G06Q 30/0633; G06Q 20/3221; G06Q 20/3223; G06Q 20/326; G06N 20/00; G06N 5/04; G06F 16/535; G06F 16/583; G06K 9/00765; G06K 9/6257; G06K 9/325; G06K 9/3241; G06K 9/00671; G06K 9/00577; G06K 2009/0059; G06K 2209/0631; G07G 1/0063
USPC ........................................................ 382/160
See application file for complete search history.

(56) References Cited

U.S. PATENT DOCUMENTS

| | | | |
|---|---|---|---|
| 9,826,149 B2 | 11/2017 | Chalom | |
| 10,402,589 B1* | 9/2019 | Madisetti | G06F 16/95 |
| 10,785,365 B2* | 9/2020 | Rodriguez | G06F 3/0488 |
| 2005/0210015 A1* | 9/2005 | Zhou | G16H 10/60 |
| 2012/0323662 A1 | 12/2012 | Otto | |
| 2015/0127490 A1 | 5/2015 | Puertas | |
| 2016/0057230 A1 | 2/2016 | Todeschini | |
| 2016/0253679 A1* | 9/2016 | Venkatraman | G06Q 30/0185 |
| | | | 705/310 |
| 2016/0267377 A1* | 9/2016 | Pan | G06Q 30/0201 |
| 2017/0200162 A1* | 7/2017 | Pourfallah | G06Q 20/405 |
| 2017/0287039 A1 | 10/2017 | Devageorge | |
| 2017/0300999 A1* | 10/2017 | Wilkinson | G06F 16/288 |
| 2018/0077146 A1* | 3/2018 | Lonas | G06F 21/604 |
| 2018/0107971 A1* | 4/2018 | Vukin | G06Q 10/087 |
| 2018/0165733 A1* | 6/2018 | Kundu | G06Q 30/0609 |
| 2018/0220973 A1* | 8/2018 | Asianto | A61B 5/0022 |
| 2018/0240088 A1 | 8/2018 | Nelms | |
| 2018/0302342 A1* | 10/2018 | Zaifman | H04L 43/0876 |
| 2018/0349695 A1* | 12/2018 | Le Henaff | G06T 5/40 |
| 2019/0028705 A1 | 1/2019 | Xu | |
| 2019/0149725 A1* | 5/2019 | Adato | H04N 1/32144 |
| | | | 348/158 |
| 2019/0244127 A1* | 8/2019 | Amado | G09B 7/02 |
| 2019/0373412 A1* | 12/2019 | Subramanian | G06Q 30/0611 |

OTHER PUBLICATIONS

Google; "ML Kit for Firebase Beta—Machine learning for mobile developers"; https://web.archive.org/web/20180511203123/https://firebase.google.com/products/ ml-kit/; May 11, 2018; pp. 1-3.

Hills, Dennis; "Understand Core ML on iOS in 5 Minutes"; https://medium.com/@dmennis/understand-core-ml-on-ios-in-5-minutes-bc8ba5411a2d; Apr. 23, 2018; pp. 1-14.

PCT; App. No. PCT/US2020/019591; International Search Report and Written Opinion dated May 8, 2020.

PCT; App. No. PCT/US2020/019596; International Search Report and Written Opinion dated May 7, 2020.

* cited by examiner

SYSTEMS AND METHODS OF PRODUCT RECOGNITION THROUGH MULTI-MODEL IMAGE PROCESSING

CROSS-REFERENCE TO RELATED APPLICATIONS

This application claims the benefit of U.S. Provisional Application No. 62/809,851 filed Feb. 25, 2019, and U.S. Provisional Application No. 62/840,748 filed Apr. 30, 2019, each of which is incorporated herein by reference in its entirety.

TECHNICAL FIELD

This invention relates generally to product recognition through image processing.

BACKGROUND

Image processing has been used in attempts to identify various objects. Typically, such processing is external to a device capturing the images. Often, such systems provide inaccurate results or take an amount of time that is impractical for many applications. Accordingly, there is a need to improve the ability to perform object identification.

BRIEF DESCRIPTION OF THE DRAWINGS

Disclosed herein are embodiments of systems, apparatuses and methods pertaining product recognition through multi-model image processing. This description includes drawings, wherein.

Figure 1:
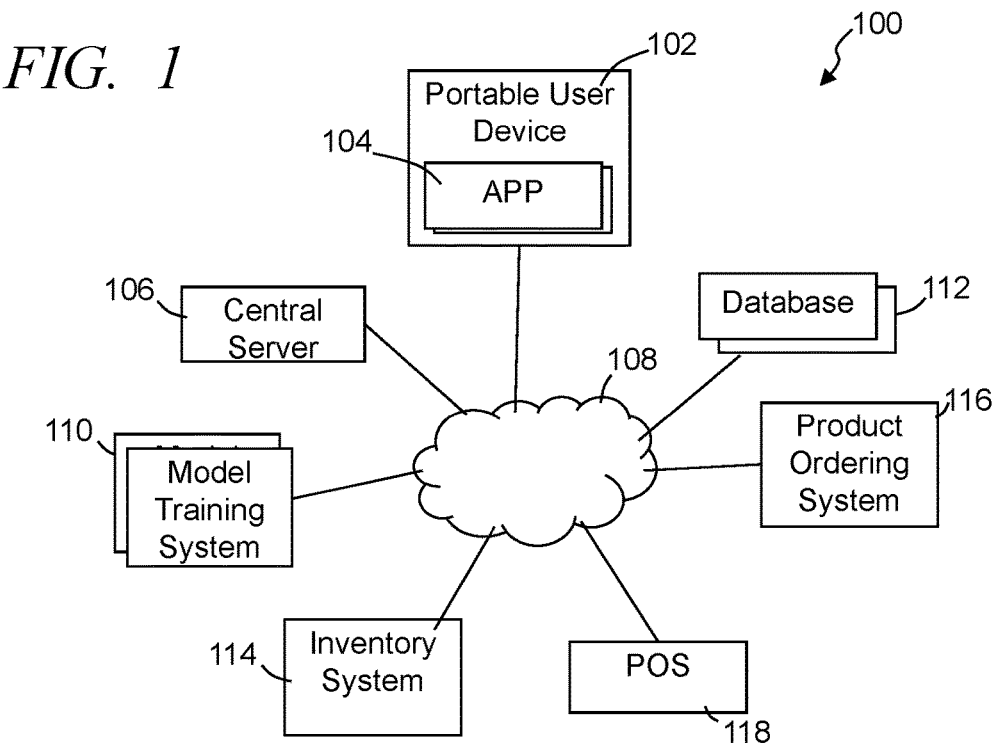
FIG. 1 illustrates a simplified block diagram of an exemplary product recognition system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein that provide retail product recognition local on portable user devices through local multi-model image processing of images and/or frames of video content captured by the portable device. The multi-model applications and cooperative evaluation enables the system to run in substantially real-time as image and/or video content is captured on the portable device, and provide very quick product recognition that can be run locally on the portable device, off-line and without having to communicate data from the portable device and wait for a reply. Further, such video and/or image product recognition can simplify obtaining product identifying information by a worker and/or customer because often a barcode cannot be accessed or is inconvenient to be accessed (e.g., large products, hot products, etc.).

Further, some embodiments alternatively or additionally provide some or all of the image and/or frame processing through multiple different model image processing at remote devices, such as servers accessible of a distributed network accessible by the mobile device over a wireless communication link. In some embodiments, a system is provided that recognizes retail products in a physical retail store. The system includes and takes advantage of customers' portable user devices, which typically include a housing, an imaging system at least partially positioned within the housing and configured to capture at least video content, wherein each video content comprising a series of frames, an image processing circuit secured within the housing and communicatively coupled with the imaging system, at least one tangible memory positioned within the housing and storing a local product database locally storing sets of product imaging data, and a decision control circuit communicatively coupled with the memory. The image processing circuit is configured to select and extract at least a subset of frames comprising one or more individual frames from the series of frames of a video content. The tangible memory is positioned within the housing and stores a local product database locally storing sets of product imaging data, wherein each set of product imaging data corresponds to one of hundreds to hundreds of thousands of different retail products available for sale from a retail store and comprises a product identifier and at least image attribute data exclusively corresponding to the respective product. In some applications, the decision control circuit is configured to: process each frame of the subset of frames by at least a first modeling technique relative to a first image attribute and obtain a corresponding first product identification probability that an item, captured within each of the subset of frames, is estimated to be a first product of the hundreds to thousands of products; process each frame of the subset of frames by a second modeling technique relative to a second image attribute that is different than the first attribute, and obtain corresponding second product identification probabilities that the item, captured within each of the subset of frames, is estimated to be the first product of the hundreds to thousands of products; determine an aggregated first identification probability of the first product as a function of the first product identification probabilities corresponding to the frames of the subset of frames; determine an aggregated second identification probability of the first product as a function of the second product identification probabilities corresponding to the frames of the subset of frames; collectively evaluate the aggregated first identification probability and the aggregated second identification probability of the first product for the frames of the subset of frames and identify when one or more of the aggregated first identification probability and the aggregated second identification probability has a predefined relationship with a collective threshold probability; and cause an image of the first product to be displayed in response to identifying that one or more of the aggregated first identification probability and the aggregated second identification probability has the predefined relationship with the collective threshold probability.

Further, some embodiments provide methods to recognize retail products in a physical retail store. Some of these methods receive one or more video content, wherein each video content comprising a series of frames. At least a subset of frames are extracted from a video content comprising one or more individual frames from the series of frames of the video content. Each frame of the subset of frames is processed by at least a two different modeling techniques relative to respective different image attributes and obtains corresponding product identification probabilities that an item, captured within each of the subset of frames, is estimated to be a first product of the hundreds of products. For example, each frame of the subset of frames can be processed according to a first modeling technique relative to a first image attribute can be performed to obtain corresponding first product identification probabilities that the item, captured within each of the subset of frames, is estimated to be the first product of the hundreds of products, and each frame of the subset of frames processed by the second modeling technique relative to a second image attribute that is different than the first attribute to obtain corresponding second product identification probabilities that the item, captured within each of the subset of frames, is estimated to be the first product of the hundreds of products. An aggregated first identification probability of the first product can be determined as a function of the first product identification probabilities corresponding to the frames of the subset of frames, and an aggregated second identification probability of the first product can be determined as a function of the second product identification probabilities corresponding to the frames of the subset of frames. The aggregated first identification probability and the aggregated second identification probability of the first product for the frames of the subset of frames can be collectively evaluated to identify when one or more of the aggregated first identification probability and the aggregated second identification probability has a predefined relationship with a collective threshold probability, and cause an image of the first product to be displayed in response to identifying that one or more of the aggregated first identification probability and the aggregated second identification probability has the predefined relationship with the collective threshold probability.

FIG. 1 illustrates a simplified block diagram of an exemplary object and/or product recognition system 100, in accordance with some embodiments. The product recognition system 100 enables numerous portable user devices 102 (e.g., smartphones, tablets, etc.) operated by different users (e.g., customers, workers, etc.) to capture images and/or video content of a product and locally identify the product through the application of multiple different image modeling techniques. The portable devices 102 typically utilize one or more software applications 104 (APP) to implement processing of the images and/or video content. Some embodiments include a central server 106 that can distribute the one or more applications to the mobile devices. The central server can be accessed by the mobile devices through one or more distributed computer and/or communication networks 108 (e.g., Internet, cellular, Wi-Fi, Bluetooth, other such networks, or combination of two or more of such networks).

In some embodiments, the system 100 includes one or more model training systems 110 that train one or more machine learning models and/or update training of such models to be distributed to mobile devices and/or to update models operating on mobile devices. The training, in some implementations, utilizes information provided by the mobile devices based on local image processing by the mobile devices through trained machine learning models being applied by the mobile devices. Additionally or alternatively, some mobile devices 102 and/or other image capturing systems can supply image and/or video data to the model training systems to be used in recognizing a product within the images and/or to further train the models based on the application of the models.

The system 100 further includes one or more databases 112. These databases can store information relevant to the operation of one or more retail stores and/or other information. For example, the databased may include a product database, a customer database, inventory database, and/or other such databases. In some implementations, a retail product database can be configured to store and maintain product information (e.g., identifier information (e.g., name, RFID information, barcode information, size, quantity, etc.), location(s) in a retail facility, quantities, shipping information, pending order information, history information, etc.), product images, image attribute information, sets of product imaging data each corresponding to one of hundreds to tens of thousands of different objects and/or retail products, which are typically available for sale from a retail store. Each product imaging data includes a product identifier and at least image attribute data exclusively corresponding to the respective product, and other such product information. Typically, one or more databases maintain customer information and/or profiles, which may be updated based on customer purchases, products identified through their personal portable devices, products considered for purchase, searching, other such information, and typically a combination of two or more of such information. The databases may be maintained by a retail store, by a retail company having multiple stores, third party entities and/or services, and the like. In some embodiments, databases store information relevant to the operation of one or more retail stores and/or other information. For example, the databased may include a product database, a customer database, inventory database, and/or other such databases. In some implementations, a retail product database can be configured to store and maintain product information (e.g., identifier information (e.g., name, RFID information, barcode information, size, quantity, etc.), location(s) in a retail facility, quantities, shipping information, pending order information, history information, etc.). Further, some embodiments include one or more inventory systems 114 that track and maintain inventory information about product quantities at one or more retail stores, products on order, quantities of products typically ordered, past order history and/or other such information. This inventory information may be accessed by one or more circuits, systems and/or devices of the system 100, such as the databases that store the inventory information, the central server to track location of inventory and/or provide location information to the inventory system, the portable user devices 102 in obtaining product information once a product has been identified through image processing, and the like. The system 100 may further include one or more product ordering systems 116 that can order products for one or more retail stores based, for example, on inventory levels, requests from customers and the like. Similarly, in some applications a customer may request one or more products through a portable device and the ordering system may order that product on the customer's behalf.

Still further, some embodiments include one or more point of sale systems 118 that allow the customer to purchase products. Such point of sale systems may be at the retail store operated by workers at the store, operated by the customers, implemented through the central server 106, implemented as a software application on a remote point of sale system (e.g., through one or more computers, servers or the like), or other such systems. In some embodiments, a terminal sales application may be executed on the central server 106 or network accesses point of a point of sale system 118 to interact with portable devices 102 of customers. Typically, such remote point of sale systems 118 are different than physical point of sale systems at a retail store, and lacks at least some of the peripheral devices of a physical point of sale system at the retail store (e.g., barcode scanner, scale, physical user interface, etc.).

Although the below description focuses on the product identification occurring on the portable device, it will be appreciated that some or all of the processing (e.g., image processing and/or model application processing, etc.) can be performed remote from the portable device. Such remote process, however, would typically add delay to obtaining the product information as a result of communicating the information, the available communication bandwidth and other such factors.

Figure 2:
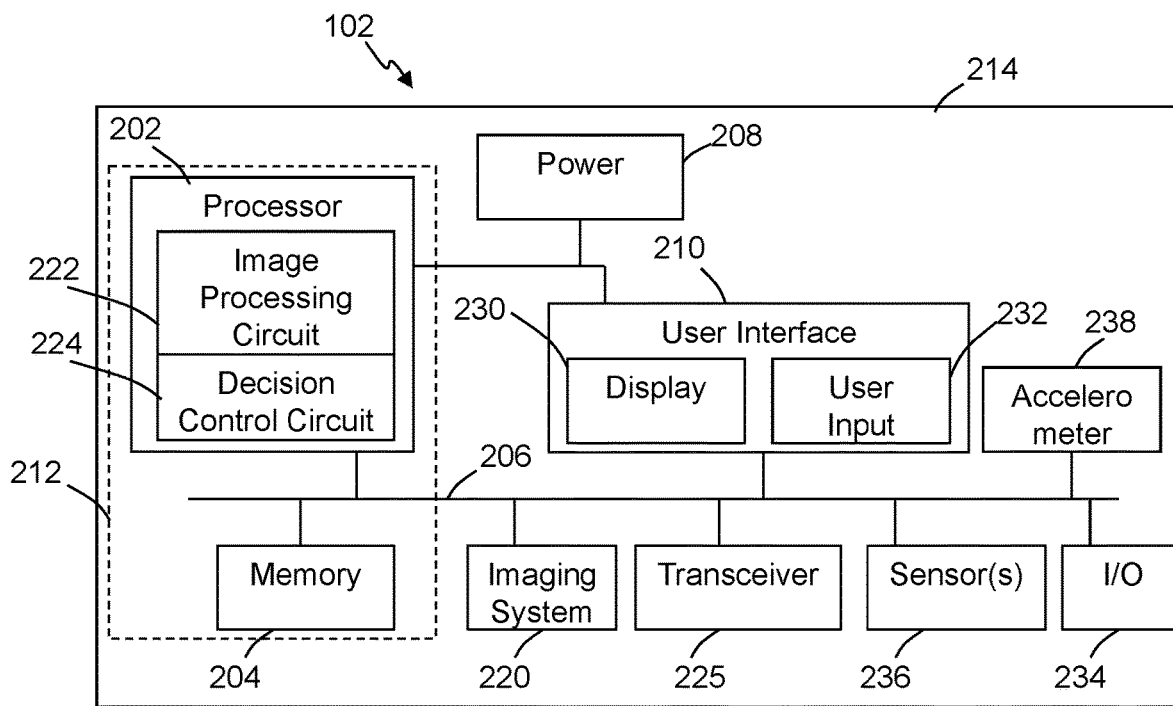
FIG. 2 illustrates a simplified block diagram of an exemplary portable device, in accordance with some embodiments.

FIG. 2 illustrates a simplified block diagram of an exemplary portable user device 102, in accordance with some embodiments. The portable device 102 typically includes one or more control circuits or processor modules 202, one or more memory 204, and one or more communication transceivers, links, paths, buses or the like 206. Further, the portable device 102 includes one or more internal and/or external power sources or supplies 208, and usually includes one or more user interfaces 210. The control circuit 202 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 202 can be part of control circuitry and/or a control system 212, which may be implemented through one or more processors with access to one or more memory 204 that can store instructions, code and the like that is implemented by the control circuit and/or processors to implement intended functionality. Typically, the memory stores one or more databases, including a local product database locally storing sets of product imaging data, where each set of product imaging data corresponds to one of hundreds to tens of thousands of different retail products available for sale from a retail store and includes a product identifier and at least image attribute data exclusively corresponding to the respective product (e.g., numeric representations and/or multidimensional arrays representing images and/or labels of the products offered for sale by the retail store). The portable device 102 further includes a housing 214, casing or other protective structure to house the control circuit 202 and memory 204, and secure one or more user interfaces (e.g., a display, keys, touch screen, etc.).

In some embodiments, the portable device further includes one or more imaging systems 220, one or more image processing circuits 222 or systems, and one or more decision control circuits 224. The image processing circuit 222 and/or the decision control circuit 224 may be separate from the control circuit 202, while in other implementations some or all of the image processing circuit 222 and the decision control circuit 224 are implemented on the control circuit through the one or more processors implementing the control circuit through software applications. The imaging system 220 can include one or more cameras that are configured to capture static images, series of images and/or video content at one or more frame rates. The imaging system 220 can, in some implementations, cause the captured images and/or video content to be at least temporarily stored on the memory 204 or other memory of the portable device.

The user interface 210 can allow a user to interact with the portable device 102 and receive information through the portable device. In some instances, the user interface 210 includes a display 230 and/or one or more user inputs 232, such as buttons, touch screen, track ball, keyboard, mouse, etc., which can be part of or wired or wirelessly coupled with the portable device 102. Typically, the portable device further includes one or more communication interfaces, ports, transceivers 225 and the like allowing the portable device to communicate over a communication bus, a distributed computer and/or communication network 108 (e.g., a local area network (LAN), the Internet, wide area network (WAN), etc.), communication link 206, other networks or communication channels with other devices and/or other such communications or combination of two or more of such communication methods. Further the transceiver 206 can be configured for wired, wireless, optical, fiber optical cable, satellite, or other such communication configurations or combinations of two or more of such communications. Some embodiments include one or more input/output (I/O) ports and/or interfaces 234 that allow one or more devices to couple with the portable device. The I/O ports can be substantially any relevant port or combinations of ports, such as but not limited to USB, Ethernet, or other such ports. The I/O interface 234 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the portable device 102 may include one or more sensors 236 to provide information to the system and/or sensor information that is communicated to another component, such as the central control system or central server 106, etc. The sensors can include substantially any relevant sensor, such as one or more accelerometer systems 238 (e.g., inertial detector, and the like), one or more gyroscopes, one or more distance measurement sensors (e.g., optical units, sound/ultrasound units, etc.), one or more light and/or proximity sensors, one or more Lidar systems (light detection and ranging), optical-based scanning sensors to sense and read optical patterns (e.g., bar codes), radio frequency identification (RFID) tag reader sensors capable of reading RFID tags in proximity to the sensor, other such sensors, or a combination of two or more of such sensor systems. The foregoing examples are intended to be illustrative and are not intended to convey an exhaustive listing of all possible sensors. Instead, it will be understood that these teachings will accommodate sensing any of a wide variety of circumstances in a given application setting.

The portable device 102 comprises an example of a control and/or processor-based system with the control circuit 202. Again, the control circuit 202 can be implemented through one or more processors, controllers, central processing units, logic, software and the like. Further, in some implementations the control circuit may provide multiprocessor functionality.

The memory 204, which can be accessed by the control circuit 202, typically includes one or more processor-readable and/or computer-readable media accessed by at least the control circuit 202, and can include volatile and/or nonvolatile media, such as RAM, ROM, EEPROM, flash memory and/or other memory technology. Further, the memory 204 is shown as internal to the control system 212; however, the memory 204 can be internal, external or a combination of internal and external memory. Similarly, some or all of the memory can be internal, external or a combination of internal and external memory of the control circuit 202. The memory 204 can store code, software, APPs, executables, scripts, data, content, lists, programming, programs, images, video content, log or history data, user information, customer information, product information, and the like. While FIG. 2 illustrates the various components being coupled together via a bus, it is understood that the various components may actually be coupled to the control circuit and/or one or more other components directly.

Figure 3:
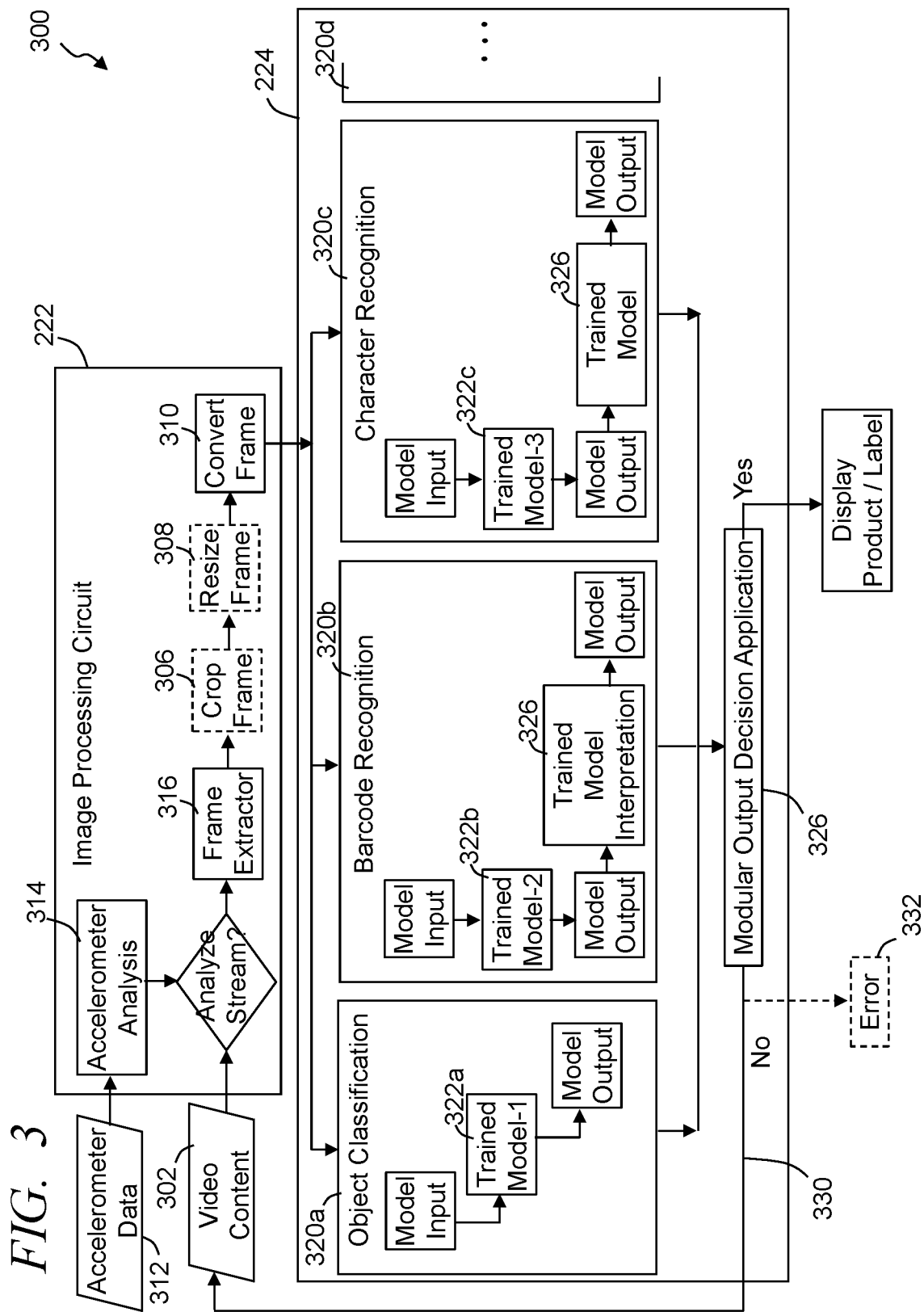
FIG. 3 illustrates a simplified block diagram of an exemplary portable device implementing image processing and identifying a product at a retail store or other object, in accordance with some embodiments.
Figure 4:
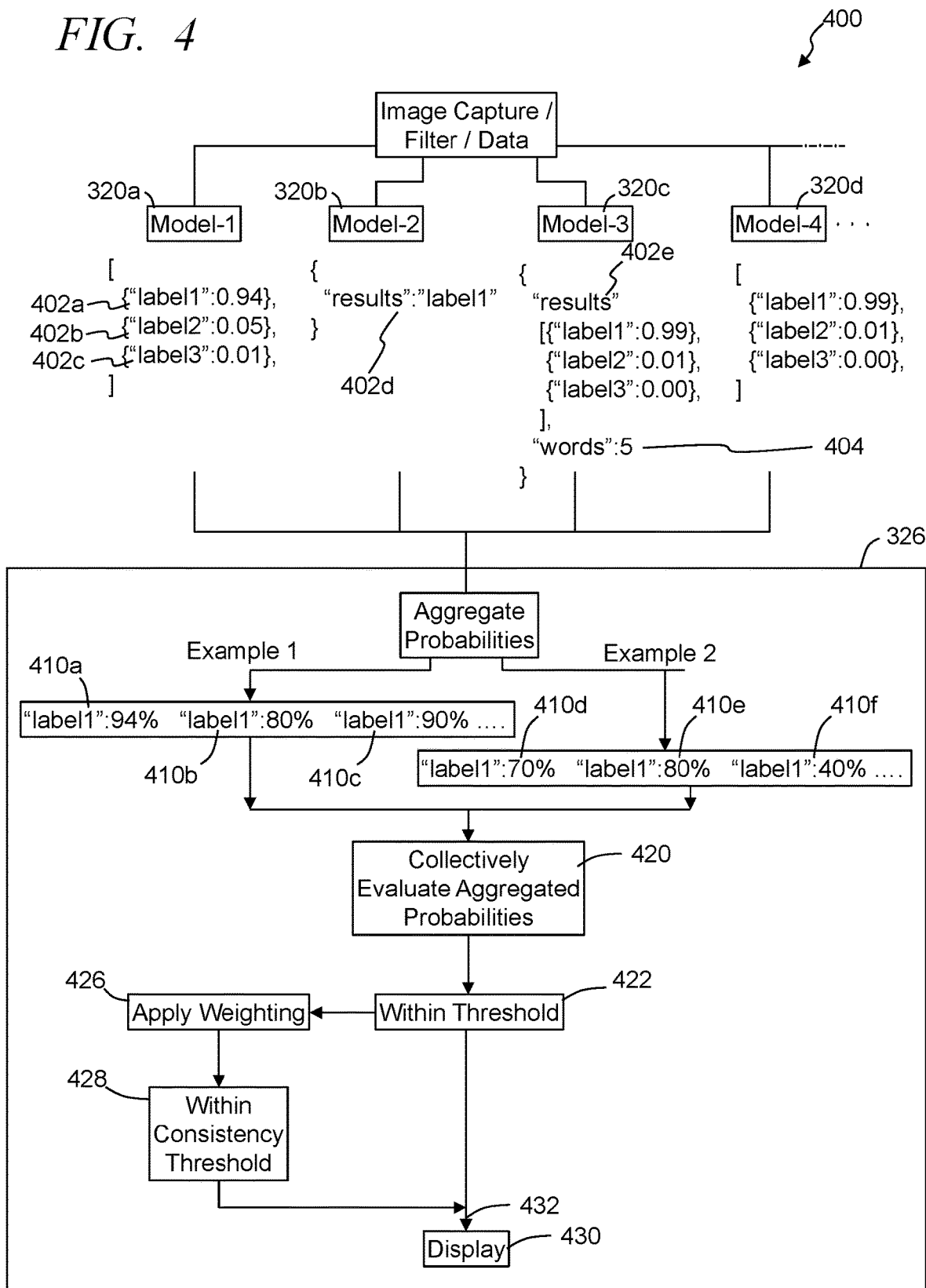
FIG. 4 illustrates a simplified block diagram of an exemplary process of identifying a product at a retail store or other object, in accordance with some embodiments.

FIG. 3 illustrates a simplified block diagram of an exemplary portable device 102 implementing image processing and identifying a product at a retail store or other object, in accordance with some embodiments. FIG. 4 illustrates a simplified block diagram of an exemplary process 400 of identifying a product at a retail store or other object, in accordance with some embodiments. Referring to FIGS. 1-4, the portable device 102, as introduced above, includes an imaging system 220 that captures images and/or video content 302, where each video content includes a series of frames.

The video content is accessed by one or more image processing circuits 222, which is secured within the housing 214 and communicatively coupled with the imaging system. In part, the image processing circuit 222 selects and extracts at least a subset of frames of the numerous frames in a video content. As such, the subset of frames comprises one or more individual frames from the series of frames of a video content. Further, in some applications, at least a threshold number of frames has to be selected to achieve a subset that can be evaluated. The threshold number may be preset, may be set based on image processing, or the like. In other instances, a threshold number of frames is not required, and as described below the process can be repeated with subsequent subsets of frames until an item is recognized or an error is detected. Similarly, in some embodiments the selected threshold number of frames are to be identified within a minimum number of frames of a video content and/or within a minimum duration of active video capturing. In some embodiments, the image processing can include one or more filtering applications, cropping applications 306 that can remove extraneous and/or background information from the frame to focus on one or more items of interest within the frame, frame resizing applications 308 that can reduce the processing needed (e.g., pixel processing and/or reduction, pixel simplification, etc.), a frame conversion application 310, other such processing applications, and typically a combination of two or more of such applications. The cropping application, resizing application and other such preprocessing can reduce the time and/or computational overhead of performing the application of the subsequent modeling processing. Some embodiments additionally or alternatively consider accelerometer data 312 (e.g., motion sensing data, inertial sensing data, etc.) from an accelerometer system 238, gyroscope data, other sensor data, and/or a combination of sensor data from multiple sensors as part of the image processing. Further, the accelerometer system and/or other sensor systems can be activated while the imaging system is active to, for example, detect movement of the portable device and output accelerometer data relative to one or more frames, and typically each frame of the video content, and associate the accelerometer data to each corresponding frame (e.g., based on timing information of the captured frames). Some embodiments utilize already available accelerometer processing performed by the portable device, such as provided in iOS and Android operating systems.

The image processing circuit 222 and/or system in selecting and/or extracting the subset of frames, in some embodiments, includes an accelerometer analysis application 314 that accesses accelerometer data 312 captured corresponding to when each frame of the video content is captured, and identifies the subset of frames of the video content that each has corresponding accelerometer data that has a predefined relationship with a movement threshold. As such, the accelerometer analysis application 314 can access the accelerometer data corresponding to each frame of a video content to determine whether the frame was captured, for example, while the portable device was stable and/or the portable device was being moved less than an acceleration threshold and/or one or more other movement thresholds. For example, those frames that were captured while the portable device was being moved more than one or more thresholds can be tagged to be excluded from use in subsequent processing to identify the product attempting to be identified. As such, the image processing circuit, based on the accelerometer data, can select the subset of frames of a video content that were captured while the portable device was stable, and the frames are more likely to be clearer and in focus. Using of the accelerometer data, other motion data and/or initial clarity image processing can allow the system to reduce the number of frames considered to those frames that are more likely to provide accurate results, and thus greatly reduce computational processing overhead, improve performance and speed of the system, as well as reduce battery consumption. Other sensor analysis systems can additionally or alternatively be used to help identify frames to be considered and/or not considered.

The image processing circuit 222 typically further includes a frame extractor application 316 that extracts at least the subset of frames. As described above, such selected subset of frames may be further processed within the image processing circuit. For example, the subset of frames can at least be converted to one or more predefined formats expected by the multiple different machine learning modeling applications 320a-d. Such formats depend on the modeling application, and are typically dictated by the modeling application developer. For example, for one or more of the modeling applications, the frames of the subset of frames can be converted to numeric representative data, such as a multidimensional array representing pixel data of the frame or portions of the frame. It is noted that FIG. 3 illustrates four modeling applications 320a-d. It will be appreciated by those skilled in the art that the system is not limited to four modeling applications, and instead can apply two, three, four or more modeling applications. Similarly, in some implementations, the image recognition may be achieved while utilizing a single modeling application. The accuracy of the identification of the product, however, is typically greatly enhanced through the use of multiple modeling applications and the cooperative evaluation of the outputs of the multiple modeling applications.

The decision control circuit 224 further processes the frame data of each of the frames of the subset of frames in identifying a product captured in the subset of frames. In some embodiments, the decision control circuit causes each frame of the subset of frames to be locally processed by at least one and typically a plurality of, if not all of, the multiple different trained machine learning modeling applications 320a-d. Typically, the subset of frames are locally processed on the portable device through the multiple different machine learning modeling applications 320a-d that are maintained on the memory 204 of the portable device and run locally on the portable device. Each of the modeling applications 320 is configured to process the frames based on at least one different image attribute that can be utilized in identifying the product or at least an aspect that can be used in identifying the products. For example, a first trained, machine learning modeling application 320a can be configured to perform an object classification relative to one or more object classification attributes of a product captured within the subset of frames and interpretation relative to a product image and/or product label, a second modeling application 320b can be configured to perform barcode recognition relative to barcode attributes and interpretation relative to a product image and/or product label, a third modeling application 320c can be configured to perform optical character recognition relative to optical character recognition attributes and interpretation relative to a product image and/or product label, other modeling applications may additionally or alternatively be utilized, and typically the decision control circuit utilizes multiple modeling applications to process each frame of the subset of frames.

In some embodiments, for example, the decision control circuit is configured to process each frame of the subset of frames by a machine learning object classification modeling technique relative to object classification image attributes, process each of the subset of frames by a barcode recognition modeling technique relative to a barcode image attribute, which is different than the object classification attribute, and process each of the subset of frames by an optical character recognition (OCR) modeling technique relative to text image attributes, which are different than the object classification attributes and the barcode image attributes. One or more other modeling applications and/or techniques relative to other recognition attributes can additionally or alternatively be applied. Further, one or more of the modeling applications can be applied and outputs be used to select one or more subsequent modeling application and/or limit or focus the implementation of a subsequent modeling application (e.g., an initial modeling application may identify a primary color or a set of colors, and use that to select one or more other modeling applications or focus the implementation of one or more modeling applications).

The modeling applications each receive frame data from the image processing circuit 222. Again, in some embodiments, the image processing circuit includes one or more frame conversion applications 310 that are configured to convert the frames into a data format intended to be used by one or more of the modeling applications 320a-d. For example, the frames may be converted to one or more arrays of numeric pixel data, one or more series or arrays of predefined strings, one or more series or arrays of alphanumeric codes, and other such formats. Further, one or more of the modeling applications 320 also receives inputs of known product data to be utilized by the modeling application to determine correlations or differences between the subframe data and the known product data. In some implementations, the known product data is also formatted in a similar way as the frame data is formatted. For example, known pictures of products, labels of products, portions of labels of products, and/or other such known product image data can be processed through the image processing circuit 222 or have previous been processed through a separate similar processing circuit or system that formats the image data into a format to be used by specific one or more modeling applications.

The modeling applications respectively further include the trained, deep learning models 322a-c that processes the input data (e.g., the converted frame data of the frames of the subset of frames, and the converted known product data) to determine whether one or more of the frames of the subset of frames includes an image of a product, label of a product, or other portion of a product that at least partially corresponds with a known product. The learning models 322a-c can be substantially any relevant modeling, whether custom developed or acquired by a third party. For example, in some embodiments, the trained learning models 322a-c may include a TENSORFLOWLITE model, a MOBILENETV2 model, ML KIT for FIREBASE, known barcode modeling applications, known OCR modeling applications, and substantially any other relevant modeling and supporting applications (e.g., CORE ML, VISION FRAMEWORK, CAFFE, KERAS, XGBOOST, TENSORFLOW, etc.) to implement the modeling on the portable device. Further, one or more of the modeling techniques may apply one or more filters and other such processing. In some embodiments, for example, the object classification modeling applies a series or sequence of multiple filters to narrow the potential items with which the item in the frame potentially corresponds. The successive filters narrow the pool of potential products. The filtering can include shape filtering, color filtering, boarder and/or boundary filtering, other such filtering, and typically a combination of two or more of such filtering. For example, in some embodiments, one or more of the models can apply a convolutions neural network application. In some applications, the object classification modeling and/or one or more of the other modeling may be implemented through modelings that are available through third party sources and/or vendors, such as but not limited to Mobile-NetV2, which may be applied through the TENSOR-FLOW™ object detection application programming interface (API).

In some embodiments, one or more of the modeling applications 320a include one or more trained model interpretation applications 324b-c that further interpret the outputs of the respective machine learning model 322b-c. In some embodiments, the modeling applications 320a-d generate outputs that include, for each frame that can be processed to at least a threshold level, a product identification probability 402 that an item, captured within each of the subset of frames, is estimated to be a particular product of hundreds to thousands of different products offered for sale by the retail store. In some instances, for example, the product identification probability includes a product identifier and a probability, determined by the modeling application, that the product identifier is accurate. In other instances, the product identification probability includes a single product identifier when a product is identified by the modeling application, and returns a null, zero or other indication that a product was not identified. In yet other instances, some modeling applications may generate one or more product identification probabilities from a single frame of the subset of frames. For example, a single modeling application may generate a set of multiple different product identification probabilities that each include a different product identifier or product label identifier and a corresponding probability that the respective identifier is accurate. Typically, one of those multiple product identification probabilities of the set has a greater probability than the other one or more product identifier probabilities. As a specific, non-limiting example, a modeling application may generate a set of three product identification probabilities 402a-c with a first including a product_1 or "label1" identifier at a 0.94 probability; a second including a product_2 or "label2" identifier at a 0.05 probability, and a third including a product_3 or "label3" identifier at a 0.01 probability. Again, one or more other modeling applications may generate a single product identification probability 402d for each frame, such as through a barcode recognition modeling application 320d. Still other product identifier probabilities may include additional information that can be used to evaluate the accuracy of the evaluation. For example, an OCR modeling application 320c may provide one or more product identifier probabilities 402e each with an identifier and a probability of accuracy, as well as a total number of words 404, alphanumeric characters, and/or other such information detected, which may be used to evaluate the accuracy of the identification.

In some embodiments, the decision control circuit 224 processes each frame of a subset of frames by two or more modeling techniques each applying different modeling applications 320. For example, for each frame of the subset of frames, a first modeling technique (e.g., object classification) can be employed applying a first machine learning modeling application 320a relative to a first image attribute and obtain a corresponding product identification probability 402 or set of corresponding product identification probabilities indicating a predicted accuracy that an item, captured within each of the subset of frames, is estimated to be a specific product (e.g., a first product) of the multiple products (hundreds to tens of thousands or hundreds of thousands of products) offered for sale at the retail store. Further, in some implementations, the decision control circuit can additionally process each frame of the subset of frames by a second modeling technique applying a second machine learning modeling application 320b relative to a second image attribute that is different than the first attribute, and obtain corresponding second product identification probability 402d or set of product identification probabilities that the item, captured within each of the subset of frames, is estimated to be the first product of the multiple of products. For example, some embodiments apply a barcode recognition modeling technique relative to a barcode image attribute. The decision control circuit can process each frame of the subset of frames by the barcode recognition modeling technique relative to the barcode image attribute that is different than the first attribute, and obtain one or more corresponding barcode product identification probabilities 402d for each frame that the item, captured within each of the subset of frames, is estimated to be the first product.

Again, the subset of frames can be processed relative to multiple different modeling applications. For example, each of frames of the subset of frames may be processed by the decision control circuit by a third modeling technique (e.g., optical character recognition (OCR)) applying a third machine learning modeling application 320c relative to one or more text image attributes that are different than the first attribute, and obtain corresponding text product identification probabilities that the item, captured within each of the subset of frames, is estimated to be the first product of the hundreds of products.

These outputs of the multiple modeling applications can be cooperatively utilized in identifying a product and/or whether there is a threshold level of confidence of an accuracy of the identified product. In some embodiments, the decision control circuit 224 includes a modular output decision application or circuit 326 that processes the product identification probabilities in attempting to confirm an identification of a product captured in a frame. An aggregation application 408 can be implemented by the modular output decision circuit to determine, for one or more of the outputs of a give modeling application, an aggregated identification probability 410*a-f* for those product identification probabilities determined for a given subset of frames or multiple subset of frames (e.g., when the multiple subset of frames are captured within a threshold time period and/or with less than a threshold motion and/or accelerometer data). For example, an aggregated first identification probability 410*a* of the first product can be determined as a function of the first product identification probabilities 402*a-c* from a first modeling technique and corresponding to the frames of the subset of frames. Similarly, an aggregated second identification probability of the first product as a function of the second product identification probabilities corresponding to the frames of the subset of frames. The aggregation implemented by the aggregation application 408 can include substantially any relevant statistical evaluation of the sets of product identification probabilities from a modeling application for a given subset of frames. For example, the aggregation can select a product identifier that has a largest number of instances in the set of product identification probabilities; can identify each consistent product identifier in the set of product identification probabilities for a subset of frames and average the corresponding probabilities to provide an average probability, and select the highest average probability that exceeds a threshold average probability and set the aggregated identification probability to include the selected product identifier and the averaged probability; exclude product identification probabilities that have a probability below a minimum probability threshold and then apply subsequent statistical and/or selection criteria to the remaining product identification probabilities (e.g., select the product identifier with the highest number of instances and average the corresponding probabilities to define an aggregated identification probability); exclude product identification probabilities that are beyond a standard deviation from an average probability; other such statistical evaluations; or a combination of two or more statistical evaluations. As such, each of the set of product identification probabilities for from the different modeling techniques can be statistically processed to obtain the corresponding aggregated product identification probabilities.

Table 1 below shows an example of product identification probabilities of X different frames constituting a subset of frames for three different modeling techniques:

| Frame | Model 1 | Model 2 | Model 3 |
|---|---|---|---|
| 1 | [{"label1": 0.94}, {"label2": 0.05}, {"label3": 0.01}] | {"results": "label1"} | [ {{"label1": 0.78}, {"label2": 0.20}, {"label3": 0.02}}, "word": 5 ] |
| 2 | [{"label1": 0.92}, {"label2": 0.07}, {"label4": 0.01}] | {"results": "label1"} | [ {{"label1": 0.99}, {"label2": 0.02}, {"label3": 0.01}}, "word": 8 ] |
| 3 | [{"label1": 0.93}, {"label2": 0.05}, {"label5": 0.02}] | {"results": null} | [ {{"label1": 0.64}, {"label2": 0.27}, {"label3": 0.08}}, "word": 2 ] |
| X | [{"label1": 0.95}, {"label4": 0.02}, {"label6": 0.01}] | {"results": "label1"} | [ {{"label1": 0.89}, {"label2": 0.09}, {"label3": 0.01}}, "word": 6 ] |

In this example of Table 1, the first model ("Model 1") produces for each frame of the subset of frames a set of one or more product identification probabilities (e.g., three product identification probabilities each corresponding to three different identified products (e.g., with an identifier such as product label "label1", product label "label2", etc.)) and a corresponding probability (e.g., 0.94, 0.04, 0.01, etc.) that the item in the frame is that identified product. For example, with respect to frame 1, the Model 1 predicted that an item in frame 1 is product "label1" with a 94% accuracy probability; is product "label2" with a 5% accuracy probability; and is product "label3" with a 1% accuracy probability. Similarly, Model 2 (e.g., a barcode recognition modeling) produces a single product identification probability for each frame of the subset of frames based on whether a barcode is detected with sufficient accuracy to correlate that to an actual barcode corresponding to a specific product (e.g., product "label1"). In this example, for Model 2, a barcode corresponding to the product "label1" was detected in each of frames 1, 2 and X, but a barcode was not detected or insufficiently detected in frame 3 resulting in a product identification probability of "null", zero or some other identification probability. Model 3 (e.g., OCR recognition modeling) produces a set of one or more product identification probabilities (e.g., three product identification probabilities each corresponding to three different identified products (e.g., with an identifier such as product label "label1", product label "label2", etc.)), a corresponding probability that the item in the frame is that identified product, as well as a word count (e.g., total number of words detected or extracted from the frame), alphanumeric character count, or some other characteristic detected. In some applications, the probability may be affected by the word count and those words being present on the actual product.

The aggregation application 408 can apply statistical evaluations to these sets of product identification probabilities to determine aggregated identification probabilities 410 associated with each of the different modeling techniques. For example, with the Model 1 technique for Table 1, the aggregation application can exclude product identification probabilities with probabilities less than a threshold level, identify the product identifier having a greatest number of occurrences (and in some instances a least a threshold number of occurrences) and average the probabilities for those occurrences, and/or other such evaluation and consolidation. This can produce an aggregate identification probability 410*a* for Model 1 of, for example, "label1" with a probability of 0.94. As a further example, with the Model 2 technique for Table 1, the aggregation application can identify when there is a threshold number of occurrences of a particular product identification probability (e.g., threshold number of "label1") and set the aggregated identification probability 410*b* to equal that product identification probability, with a probability corresponding to the percentage of times the barcode is detected in the frames of the subset of frames, or a weighted percentage based on the percentage of times the barcode is detected, or other such determination. Continuing this example for the Model 3 technique of Table 1, the aggregation application can apply a similar statistical evaluation as performed with the Model 1, or some other evaluation, which may or may not take into account the additional parameters (e.g., word count). As such, an aggregated identification probability 410*c* may be provided as "label1" with a probability of 90%.

Some embodiments further include a collective evaluation circuit 420 or application that collectively evaluates the set of aggregated identification probabilities 410 for a given subset of frames. This collective evaluation can determine, for example, whether there is a threshold consistency between the multiple aggregated identification probabilities 410, statistically process the multiple aggregated identification probabilities to obtain a collective identification probability and determine whether that collective identification probability exceeds a threshold, other such collective evaluation of the multiple aggregated identification probabilities, or a combination of two or more of such collective evaluations. In some embodiments, the collective evaluation circuit collectively evaluates the multiple aggregated identification probabilities (e.g., aggregated first identification probability, the aggregated second identification probability, and aggregated third identification probability of the first product for the frames of the subset of frames) and identify when one or more of the multiple aggregated identification probabilities has a predefined relationship with a collective threshold probability. For example, an aggregated character classification identification probability of a product can be determined as a function of the corresponding character classification product identification probabilities corresponding to the frames of the subset of frames, an aggregated barcode identification probability can be determined of the product as a function of the corresponding barcode product identification probabilities corresponding to the frames of the subset of frames, and an aggregated text identification probability can be determined of the product as a function of the text product identification probabilities corresponding to the frames of the subset of frames. These aggregated identification probabilities for the frames of the subset of frames can be collectively evaluated and identify when one or more of the aggregated character identification probability, the aggregated barcode identification probability and the aggregated text identification probability has a predefined relationship with a collective threshold probability.

In some embodiments, the decision control circuit 224 and/or collective evaluation circuit further determines whether there is a threshold consistency 422 within the set of aggregated identification probabilities (e.g., at least a threshold number of the aggregated identification probabilities have the same product identifier; at least a threshold number of aggregated identification probabilities have the same product identifier and have a threshold probability; etc.). Similarly, the collective evaluation may, in some instances and/or applications, include discarding one or more of the aggregated identification probabilities (e.g., when it is a threshold deviation from the other aggregated identification probabilities, etc.). In the example above relative to Table 1, the collective evaluation circuit may identify that the threshold number of occurrences of "label1" are present with threshold levels of probability to identify a threshold consistency. As such, the decision control circuit can output the resultant identification probability 432 with the consistent product identifier (e.g., "label1"), and when relevant a corresponding resulting identification probability. This can cause the portable device to access an image and/or other relevant product information for the identified product (e.g., "label1") and present 430 that to the user (e.g., display an image of the product and/or corresponding product information (e.g., nutritional data, size, quantity, weight, warnings, pricing, etc.), which may be locally stored and/or maybe acquired from a remote source (e.g., external product database, inventory system 114, central server 106, etc.). For example, the decision control circuit can cause an image of the product to be displayed 430 (e.g., "label1" in this example) in response to identifying that one or more of the set of aggregated identification probabilities has the predefined relationship with the collective threshold probability.

Some embodiments may apply weightings 426 to one or more of the aggregated identification probabilities 410 as part of the collective evaluation. In some implementations, a first weighting may be applied to an aggregated first identification probability 410*a* as a function of an expected degree of accuracy relative to the corresponding modeling image attribute (e.g., object classification) to provide a weighted first product identification probability. Similar weightings may additionally or alternatively be applied to one or more of the other aggregated identification probabilities. For example, a second weighting may be applied to an aggregated second identification probability 410*b* as a function of an expected degree of accuracy relative to the corresponding modeling image attribute (e.g., barcode recognition) to provide a weighted second product identification probability. These weights can be preset, determined as a function of a level of consistency of the product identification probabilities 402 for the subset of frames, dependent on the type of modeling and/or modeling attribute, an identified location of the portable device and/or the object being considered can affect the weighting, other such factors, or a combination of two or more of such factors. For example, a greater weighting can be applied to modeling that is expected to provide a higher level of accuracy (e.g., barcode recognition with a threshold level of frames capture the barcode), versus other modeling that is has a lower expected accuracy (e.g., character recognition). Some embodiments additionally or alternatively take other factors or characteristics into consideration in determining a weighting to apply. In some implementations, for example, the decision control circuit, in applying a weighting to a product identification probability can identify a number of textual words 404, alphanumeric characters, or other detect characteristics (e.g., number of detected boarders, number of detected color variations, number of transitions between color changes, gradients in changes is size or width, angles of boundaries or lines, etc.) detected in each frame of the subset of frames that are present on the image of a product captured in the frames, and multiply the number of textual words or other characteristic by a multiplier (e.g., word multiplier) to define the second weighting corresponding to that aggregated identification probability and/or product identification probability. Other weightings can additionally or alternatively be applied depending on one or more factors such as but not limited to type of modeling applied, the modeling attribute, expected level of accuracy, expected variation in accuracy, expected difference in accuracy between different modeling techniques, amount of detected movement (e.g., based on accelerometer data, gyroscope data, and/or other sensor data), determined clarity of frames, size of an item captured in an image, estimated distance from an item in a frame, background issues, other such factors, or combination of such factors.

The collective evaluation can be applied to the weighted product identification probabilities to identify when there is a threshold consistency 428 (which may be the same as or different than the previous consistency threshold) between the multiple weighted product identification probabilities. It is noted that in some instances one or more of the aggregated identification probabilities may not be weighted. Again, the image of the identified product and/or other information can be provided (e.g., displayed through the portable device) to the user in response to identifying the threshold consistency between the weighted product identification probabilities.

Further, the application of weightings may be in response to an initial determination that the set of aggregated identifications for a subset of frames does not achieve a consistent threshold or other condition. In some applications, the decision control circuit identifies when there is an aggregate threshold inconsistency 422 between two or more of the aggregated identification probabilities, and applies the weighting 426 to one or more of the aggregated identification probabilities in response to identifying the threshold inconsistency between the two or more aggregated identification probabilities. The threshold inconsistency may be an inconsistency in product identifier, threshold inconsistency in probabilities, a threshold number of the aggregated identification probabilities having different product identifiers, other such thresholds, or a combination of two or more of such thresholds or conditions. FIG. 4 shows a second example ("Example 2") where the aggregated identification probabilities 410*d-f* result in a determined inconsistencies and/or insufficient consistent levels of probability. For example, a first aggregated identification probability 410*d* may have a product identifier of a second product "label2" at a probability of 70%, a second aggregated identification probability 410*e* with a product identifier of a first product "label1" with a probability of 80%, and a third aggregated probability 410*f* having a product identifier for the first product "label1" with a 40% probability. The decision control circuit may apply the different weightings in response to determining that is the threshold inconsistency between two or more of the aggregated produce identification probabilities. Again, different weightings may be applied to the different aggregated probabilities based on one or more factors. For example a first weighting may be applied to the first aggregated probability based on a first expected degree and/or level of accuracy relative to the corresponding first image attribute such as when the modeling technique is object classification providing a weighted first product identification probability; a second weighting applied to the second aggregated probability based on a second expected degree and/or level of accuracy such as when the modeling technique is barcode recognition to provide a weighted second product identification probability; and a third weighting applied to the third aggregated probability based on a third expected degree and/or level of accuracy such as when the modeling technique is character recognition, which may take into consideration other factors such as the number of words identified and corresponding to words actually on the predicted product (e.g., "label1"), to provide a weighted third product identification probability.

Table 2 below shows an example of the above example weightings that are applied to the set of three aggregated identification probabilities (Agg. ID Prob.) 410*a-c*, which correspond in this example to aggregated identification probabilities determined from an object classification modeling, a barcode recognition modeling, and a character recognition modeling (e.g., OCR).

| Agg. ID Prob: | Model 1 "label2"; 70% | Model 2 "label1"; 80% | Model 3 "label1"; 40% |
|---|---|---|---|
| Weighting: | 3 | 5 | 1* word multiplier (.25)* ave. num. words |
| Score | 210 | 400 | 80 |

In this example, a weighting of "3" is applied to the probability of accuracy (70% in this example) for the Model_1 technique (e.g., based on expected accuracy of the object classification) providing a score of 210; A weighting of "5" is applied to the probability of accuracy (80% in this example) for the Model_2 technique; and a weighting calculation is applied to the probability of accuracy (40% in this example) for Model_3 and times a word multiplier (e.g., 0.25) times the average number of words detected in the product identification probabilities (e.g., average of 8 words) providing a score of 80 in this example (i.e., 40*0.25*8). The weighting applied can be dependent on one or more factors such as but not limited to the expected level of accuracy and/or comparative analysis over time of accuracy of results (e.g., barcode is typically and expected to be more accurate than character recognition and OCR, while character recognition may be expected to be more accurate than OCR, however, OCR may be more accurate when a larger number of characters and/or words a recognized that correspond to a product label, etc.), a level of determined correlation with potential products (e.g., number of words and/or characters identified that match with the identified object), identification from previous frames, historical accuracy of detecting identified products, historical accuracy based on different modeling techniques, the type of product(s) and/or packaging of the one or more products that have been identified, the initial determined probability of accuracy, other such factors, or a combination of two or more of such factors. Further, some or all of the weightings may be predefined (e.g., based on the identified products), may be determined and/or adjusted on the fly, or some combination thereof. The decision control circuit can determine whether there is a sufficient consistency based on the weightings and provide a resultant identification probability 432 of the product based on the weighted product identification probabilities. In this example (illustrated in FIG. 4 as Example 2), a weighted score of 480 for "label1" and a weighted score of 210 for "label2", or some other indication of the determined weighted probability (e.g., an expected probability of expected accuracy, such as approximately 70% expected for the product "label1", and approximately 30% expected accuracy of product "label2"). Additionally or alternatively, the scores can be evaluated relative to a threshold difference or other consideration. For example, when there is a threshold difference in weighted scores the higher weighted aggregate identifier is selected. In some embodiments, the decision control circuit may cause both products to be presented on the portable device and/or present their relative scores. This can allow the user (e.g., customer, worker, etc.) to select the appropriate product or identify that both are inaccurate. Further, the decision control circuit may prevent a result from being output when a threshold consistency or consensus cannot be determined from the subset of frames and cause further evaluation 330 of subsequent captured frames and/or instruct the user to capture another set of frames of video content for the item. An error notification 332 may be generated when consistency cannot be identified, such as after a threshold number of subsets of frames are evaluated and a consistency cannot be obtained.

Further, some embodiments apply one or more prefiltering in attempts to improve the speed of processing the image data and the recognition of products. In some applications, for example, the location of the portable device may be used to limit products considered in the image analysis. By utilizing the location, a product mapping may be used to restrict the pool of products considered to those products expected to be located within a threshold distance of that location. The threshold distance can vary based on one or more factors, such as but not limited to the predicted accuracy of the portable device location information, the predicted accuracy of product placement, the number of customers and/or congestion in the store, a duration since products have been restocked and/or products in that general area have been restocked, other such factors, or a combination of two or more of such factors. Further, the location or general location of the portable device may be identified by consideration of background information acquired from one or more frames (e.g., predefined or known objects in a background, such as glass doors of a freezer section, a "meat" sign in the back ground, a predefined pattern, location barcode detected in the frame, etc.). The general location can be used to focus the potential products based on a general category or categories based on that location. Similarly, some embodiments apply one or more additional or alternative filtering in identifying products. For example, products to be considered in the processing may be limited based on a customer's shopping history, available product inventory, product preferences, pricing information, "on-sale" information, and/or other such information. As a more specific, non-limiting example, products may be prefiltered based on products expected to be considered by a particular customer based on the customer's prior shopping habits and/or preferences. As another non-limiting example, products may be prefiltered based on products expected to be considered by a particular worker based on the workers prior imaging habits, assigned task and/or corresponding area of the retail store where the customer is assigned to perform a task (e.g., assigned to consider product stocking on a particular aisle of the retails store, assigned to consider products as customers exit the retail store, a system assigned at a point of sale system, etc.), and/or other such factors.

Figure 5:
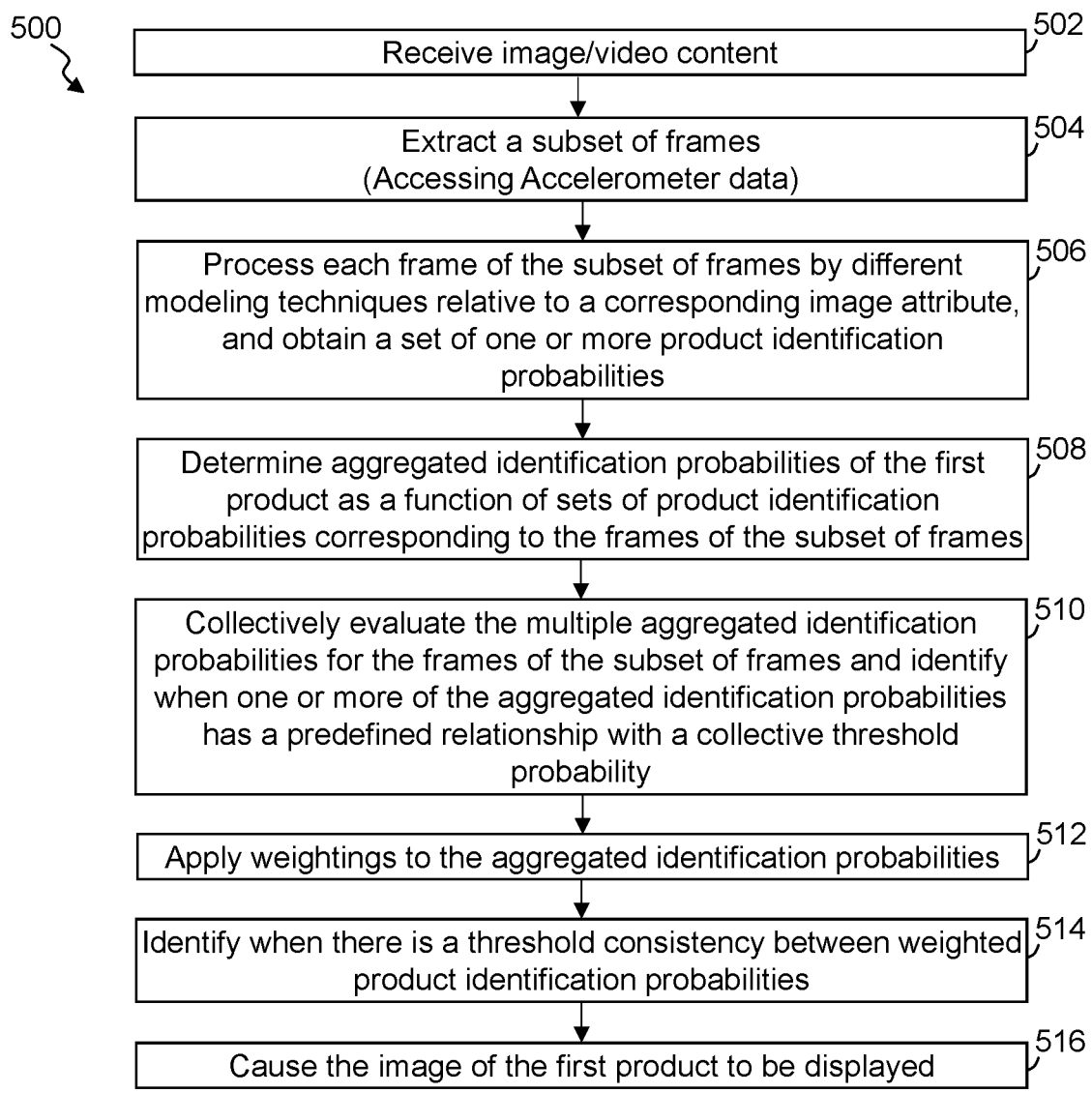
FIG. 5 illustrates a simplified flow diagram of an exemplary process of recognize retail products in a physical retail store, in accordance with some embodiments.

FIG. 5 illustrates a simplified flow diagram of an exemplary process 500 of recognize retail products in a physical retail store, in accordance with some embodiments. In step 502 one or more video content is received and/or captured, where each video content includes a series of frames. Typically, the video content is captured by a camera system of a portable user device 102. In step 504, at least a subset of frames are extracted from a video content, with the subset of frames includes one or more individual frames from the series of frames of the video content. In some embodiments, the step of extracting of the subset of frames includes accessing accelerometer data captured corresponding to when each frame of the video content is captured, and evaluating the accelerometer data relative to the corresponding frame (e.g., associated through timing or the like) to identify the subset of frames of the video content that each has corresponding accelerometer data that has a predefined relationship with a movement threshold.

In step 506, each frame of the subset of frames is processed by at least one and typically multiple different modeling techniques relative to a corresponding image attribute, and obtain a set of one or more product identification probabilities, each set corresponding to one of the different modeling techniques, that an item, captured within each of the subset of frames, is estimated to be a particular product of the hundreds to tens of thousands of products that may potentially be available from a retail store in which the user (e.g., customer, worker, third party delivery person, etc.) is attempting to identify products. For example, each frame of the subset of frames is processed by a first modeling technique by applying a first trained machine learning model through a modeling application (e.g., barcode recognition, object classification, character recognition, or other such modeling techniques) relative to a first image attribute and obtaining a corresponding first product identification probability that an item, captured within each of the subset of frames, is estimated to be a first product of the hundreds of products, and subsequently or in parallel process each frame of the subset of frames by a second modeling technique relative to a second image attribute that is different than the first attribute and obtaining corresponding second product identification probabilities that the item, captured within each of the subset of frames, is estimated to be the first product of the products.

In step 508, an aggregated identification probability, for each set of the product identification probabilities, is determined of the product as a function of the corresponding set of product identification probabilities corresponding to the frames of the subset of frames. For example, an aggregated first identification probability of the first product is determined as a function of the first product identification probabilities corresponding to the frames of the subset of frames, and an aggregated second identification probability of the first product is determined as a function of the second product identification probabilities corresponding to the frames of the subset of frames.

In step 510, the process collectively evaluates the multiple aggregated identification probabilities, each corresponding to one of the modeling techniques, of the first product for the frames of the subset of frames and identifies when one or more of the aggregated identification probabilities has a predefined relationship with a collective threshold probability. For example, the process can collectively evaluate the aggregated first identification probability and the aggregated second identification probability of the first product for the frames of the subset of frames and identify when one or more of the aggregated first identification probability and the aggregated second identification probability has a predefined relationship with a collective threshold probability.

Some embodiments include step 512 where one or more weightings or other factors can be applied applying to one or more of the aggregated identification probabilities. For example, a first weighting can be applied to the aggregated first identification probability as a function of an expected degree of accuracy relative to the first image attribute to provide a weighted first product identification probability, and a second weighting can be applied to the aggregated second identification probability as a function of an expected degree of accuracy relative to the second image attribute to provide a weighted second product identification probability. In some implementations, an aggregate threshold inconsistency between the aggregated first identification probability and the aggregated second identification probability may be identified, and the weightings be applied to one or more of the aggregated identification probabilities in response to identifying the threshold inconsistency between the aggregated first identification probability and the aggregated second identification probability. Further, the type and/or quantity of weighting can depend on one or more factors and/or conditions. As one non-limiting example, some embodiments in a weighting, for example the second weighting to the second product identification probability, identify a number of textual words detected in each frame of the subset of frames that are present on the image of the first product, and multiplying the number of textual words by a word multiplier to define the second weighting. Some embodiments optionally include step 514 where the process identifies when there is a threshold consistency between the weighted first product identification probability and the weighted second product identification probability.

In step 516, an image of the first product is caused to be displayed on the portable device in response to identifying that one or more of the aggregated identification probabilities (e.g., the aggregated first identification probability and the aggregated second identification probability) has the predefined relationship with the collective threshold probability. As introduced above, some embodiments apply a weighting. Accordingly, in some implementations, the process causes the image of the first product to be displayed in response to identifying the threshold consistency between the weighted first product identification probability and the second weighted product identification probability.

The identified product can be virtually added to a virtual shopping cart and the customer can physically add the product to a physical cart as the customer shops for products in the retail store. The product may be added to the virtual cart in response to the customer confirming the accuracy of the product and/or in response to the customer confirming the product and/or a quantity of that product is to be added to the virtual cart. Upon completing the shopping, the customer can initiate a checkout of and payment for each product within the virtual shopping cart. In some embodiments, the initiation of the checkout of the virtual cart includes activating a generation at a central server of an order corresponding to the virtual cart and each product included in the virtual cart. A machine-readable representation of the order can be dynamically generated that corresponds to the virtual cart. In some embodiments, the machine-readable representation of the order is configured to be scanned by a scanning system associated with a point of sale system to acquire cost information of the products in the virtual cart. Additionally or alternatively, in some embodiments, the initiation of the checkout of the virtual cart includes activating a generation at the central server of the order corresponding to the virtual cart and each product included in the virtual cart. A customer can authorize payment for the products represented in the virtual cart, and receive a confirmation of payment at the portable user device 102. In some embodiments, the confirmation of payment is configured to be displayed on a display of the portable user device to confirm payment prior to the customer leaving the retail store.

In some embodiments, one of the multiple modeling techniques includes a barcode recognition modeling technique where the corresponding image attribute is a barcode image attribute. In obtaining the product identification probabilities for such a barcode recognition modeling technique, some embodiments process each frame of the subset of frames by the barcode recognition modeling technique relative to the barcode image attribute that is different than the first attribute. The process obtains a set of one or more corresponding barcode product identification probabilities that the item, captured within each of the subset of frames, is estimated to be the first product of the numerous products. The corresponding aggregated identification probability of the first product can be determined as a function of the barcode product identification probabilities corresponding to the frames of the subset of frames.

Again, multiple different modeling techniques can be applied to the subset of frames. For example, step 506 can further additionally or alternatively include processing each frame of the subset of frames by an optical character recognition (OCR) modeling technique relative to text image attributes that are different than the first attribute, to obtain corresponding text product identification probabilities that the item, captured within each of the subset of frames, is estimated to be the first product of the numerous products. Similarly, step 508 can determine an aggregated text identification probability of the first product as a function of the text product identification probabilities corresponding to the frames of the subset of frames. Further, step 510 can additionally or alternatively include collectively evaluating the aggregated first identification probability, the aggregated barcode identification probability and the aggregated text identification probability of the first product for the frames of the subset of frames, and identifying when one or more of the aggregated first identification probability, the aggregated barcode identification probability and the aggregated text identification probability has a predefined relationship with the collective threshold probability.

Some embodiments, in determining one or more of the aggregated identification probabilities statistically evaluate one or more of the sets of product identification probabilities. For example, the first product identification probabilities may be statistically processed to obtain the aggregated first identification probability, and/or the second product identification probabilities may be statistically processed to obtain the aggregated second identification probability; identifying when there is a threshold inconsistency between the aggregated first identification probability and the aggregated second identification probability. Further, some embodiments apply, in response to determining there is a threshold inconsistency between the aggregated first identification probability and the aggregated second identification probability, a first weighting to the aggregated first identification probability as a function of an expected degree of accuracy relative to the first image attribute to provide a weighted first product identification probability, and/or apply a second weighting to the aggregated second identification probability as a function of an expected degree of accuracy relative to the second image attribute to provide a weighted second product identification probability. A resultant identification probability of the first product can be determined based on the weighted first product identification probability and the weighted second product identification probability.

Accordingly, some embodiments provide enhancements and a framework to provide product and object recognition locally on a mobile device and/or remotely from the mobile device. By maintaining the processing local to the mobile device the system identifies products quickly and easily. In some embodiments, image data is provided to one and typically multiple machine learning models for analysis. The outputs from these machine learning models are collected, cooperatively evaluated, potentially weighted, and analyzed in order to collectively aggregate the probabilities singular probabilities that collectively provide a more accurate product identification than a single machine learning model can provide. Some embodiments further score, rate or prioritize one or more outputs from the machine learning models in evaluating the correlations between outputs from different models. In some instances, when the results correlate and there is consensus from multiple different models for a single combined result, an identified product is returned, which may be displayed and/or otherwise identified to a user. As such, some embodiments utilize mobile-optimized machine learning models and run these models at a rate of several times per second (e.g., at a rate of 5, 10, 20 or more frames per second), which may correspond to a frame rate of video content, which may be implemented in sequence and/or in parallel, so that more results can be produced per second, and can be cooperatively evaluated to determine a consensus identification of a product. Because of the local processing and the rapid response provided while avoiding the delays of communicating with a remote device, the number of frames that can be processed can be increased over other systems that attempt to remotely communicate one or more images, which provides for an enhanced degree of accuracy in identification of the product. Accordingly, at least some embodiments greatly improve accuracy or at least reduce the accuracy issues of running machine learning models in a mobile or embedded environment thus making it a valid and accurate rival to expensive server processing that are slower and less responsive. Still further, some embodiments usage of an accelerometer data and/or other sensor data to help determine whether the device is positioned properly to capture good video of an object so that the input to the models is solid and/or in selecting subsets of frames to be applied to the models. Additionally, the system cooperatively evaluates the outputs from multiple different models operating in real-time to provide a consensus output in real-time that is consistently more accurate in identifying products from the mobile device. Further, the selection of subsets of frames and the use of multiple models reduces or eliminates bad input to real-time mobile-optimized computer vision models, which in part allows for plausible usage of computer vision in a mobile or embedded environment as a result of having better control of both the input and the output of known models. Further, the system reduces false positives in the machine learning models and yields a much higher accuracy in results in part through the multi-model application with the results being collective evaluated to identify a consensus identification.

Some embodiments provide an accelerometer-assisted, edge-based, multi-variant, multi-stage encapsulated deep learning inference system for real-time and offline product recognition. In some embodiments, the system removes remote server processing that requires uploading images from the capturing device, and instead the capturing device does the analysis local in real-time. This allows minimal latency, faster recognition, and does not require internet connectivity. Further, some embodiments utilize accelerometer data in selecting images and controlling the input of image data into one or many machine learning models and accordingly achieve more accurate output from the models. Some embodiments additionally cooperatively and collectively take the raw output from the machine learning models over a series of frames of video content, collectively analyzing them, and returning an aggregate result. This reduces false positives in the machine learning models and results in a much higher accuracy in the outputted identified object.

As described above, the system trains one or more models 322, and typically multiple machine learning models, that can be communicated to the portable user devices of customers, workers or other users to be used local on the portable user devices to identify products from images and/or video content captured by the portable user devices. The training is typically based on images, frames of video content and/or other such image data of the products available from the retail company operating one or more retail stores. Again, retail stores often offer thousands of products, and many retail stores may offer tens or hundreds of thousands of products. Accordingly, the training of these models based on the products available can, in some instances, be time consuming. Similarly, the training based on these quantities of products can occupy extensive amounts of processing resources of one or more servers and/or computer systems. Still further, the resulting trained models 322 can be relatively complex and/or large, and can result in delayed processing on the portable user device and/or occupy a significant amount of memory on the portable user device. Accordingly, some embodiments improve reduce processing time and processing overhead of implementing the models, while improving results, by limiting the number of products used in training the models. Still further, some embodiments customize the training of the models for customers, workers and/or other users.

In some embodiments, the customization can take advantage of knowledge of the customers and customer profiles, which can include information such as, but not limited to, the customers' purchase histories, products customers have previously attempted to identify through image recognition, products customers have search for in on-line shopping provided by or for the retail company, customer product preferences, customer partiality vectors and their correlations with product vectorized characterizations, geographic area where a customer lives, other such information, and typically a combination of such information. Further, some embodiments additionally or alternatively take advantage of a knowledge of a location of a customer and/or the customer's portable user device. Some embodiments may utilize retail store profiles which can include information such as, but not limited to, identifiers of the retail stores and/or locations of the retail stores the customer typically visits, products relevant to a particular retail store and/or geographic location of a particular store, other such information, or a combination of such information. Using such customer profile information, location information, retail store profile information and/or other such information, the system can generate a limited listing of products from the thousands or hundreds of thousands of products. A limited listing of products can be generated for each customer, or can be generated for collections of customers. The limited listings include subsets of tens of retail products that the customer is predicted to attempt to identify through image recognition implemented on the portable user device associated with the customer.

The limited listing can then be used to customize the training of the models relative to those limited products identified in the limited listing. This can greatly reduce the time to train the models, simplifies the training, reduce the processing overhead to train the models, typically reduces the memory size of the trained models, and other such advantages of training the models. Still further, the customized trained models typically reduce the memory requirements on the portable user device, reduce computational processing on the portable user device, improves accuracy of product identification, reduced processing time, provides faster results, and other such advantages at the portable user device. Again, the training may be specific for an individual customer. Additionally, models may be trained for a group of potential users (e.g., a family, a group of users having similar purchase histories, customers in a geographic area, group based on one or more demographic characteristics, etc.), trained based on a location (e.g., a location of a particular retail store, a neighborhood, a city, a general geographic area, etc.), trained for a generic customer, trained for a particular worker and/or for one or more tasks intended to be performed by workers, trained for locations within the retail store where workers are perform tasks, or the like. The training may be based on an aggregation and/or statistical evaluation of customer profile and/or customer history information associated with that group or determined to be relevant to the intended group. For example, the customer profiles of multiple customers may be statistically evaluated (e.g., averages, median, standard deviation, etc.) to specify a group profile with group information that corresponds to user profiles of customers (e.g., group profile includes a hypothetical group purchase history formed from purchase histories of multiple customers, a hypothetical group search history formed from search histories of multiple customers, a hypothetical product scan history formed from scan histories of multiple customers, etc.).

As described above, the product recognition system 100 includes one or more model training systems 110. The model training systems are configured to train models to be used in processing images and/or video content to identify one or more products captured in images and/or video content. Further, in some implementations, the model training system can train models to be used local on customer portable user devices 102. Still further, the model training system 110 can be configured to customize the training to produce one or more customized models that are customized for a particular customer or group of customers.

In some embodiments, one or more of the model training systems are communicatively coupled with the product database and customer database, and configured to access product data and customer data. The modeling training system includes one or more training control circuits that communicatively couple with one or more tangible memory storing a rules database maintaining rules and code that is accessible to and executable by the one or more training control circuits. Again, the customer database can store information about each of a plurality of different customers of a retail company operating one or more retail stores. The customer information can include one or more of, but is not limited to, a customer profile storing one or more of purchase history information, product search history information (e.g., on-line searching, searching at a kiosk in a retail store, etc.), product preference data, store identifiers for one or more stores at which the customer has shopped, residence information and/or address(es), work information and/or address(es), employment information, demographic information, relationship information (e.g., family members, friends, associates, etc.), group associations, other such information, and typically a combination of two or more of such information. The retail product database stores product information for each of tens of thousands of different retail products available for sale from the first retail store. Non-limiting examples of product information for each of the products can include one or more of, but is not limited to, product identifier information, pricing information, location information (e.g., one or more locations within one or more retail stores, locations in distribution centers, in transit locations, etc.), quantity information, shipping information, pending order information, history information, product images, product imaging data corresponding to the respective product, image attribute data exclusively corresponding to the respective product, other such product information, and typically a combination of two or more of such information.

The model training system is configured to use customer information (or other information depending on the expected user of the portable device and/or the task to be performed) to train one or more models for one or more customers or other users. The below is described with reference to customizing one or more models for a particular customer. It is noted, however, that model customization may be implemented for groups of customers (e.g., family, group with similar shopping history, group based on location, etc.), one or more workers, and/or other users. In some embodiments, the model training system identifies a customer of the plurality of customers (or a group of customers) for which customization is to be performed. This identification may be based on a schedule of customization or updating of customization of models, may be in response to a request from a customer, may be based on and/or in response to changes to a customer profile and/or customer information, may be based on a detection of a customer's mobile device being within a threshold distance of a particular retail store, other such factors, or a combination of two or more of such factors. Based on the identification, the model training system can access, in the customer database, customer information and/or a customer profile associated with the identified customer. In at least some embodiments, the model training system further access the rules database and obtains or accesses a set of one or more filtering rules, and applies the set of one or more filtering rules to the product database based on the customer information for the identified customer or identified group. For example, the filtering rules use one or more of customer purchase history information, customer search history information, and customer product preference data corresponding to the identified customer, and filter the tens of thousands or more products potentially available through the retail company.

The filtering enables the system to identify products that are more relevant to the identified customer and generate, based on the results of filtering of the product database, a listing of products specific to the customer. This listing comprises a subset of tens of retail products (e.g., 30, 100, 1000, 5000), of the tens of thousands of retail products, that the customer is predicted to be more likely to attempt to identify one or more of the products of the subset of tens of retail products through the image recognition implemented on the portable user device 102 associated with the customer. According, the model training system can reduce the number of products for which one or more models are trained. This provides one or more model that are trained based on a much smaller list of products that are relevant to the customer, while using a smaller set of image data, and results in a smaller model that is communicated to the portable device associated with the customer. The smaller model utilizes less storage space and processing power, and typically processes image data faster in use to get to identify a product that the customer is attempting to identify through the portable user device using the image and/or video data. The filtered listing of products typically is less than 50% of the total number of products available through the retail store and/or combination, and in many instances is less than 20% of the available products. For example, the filtering may result in a listing of about one thousand products.

The filtering can apply one or algorithms that identify particular products that the customer has purchased within a threshold period of time (e.g., within the last year, within the last 6 months, or some other threshold), and include each of those products into the listing. Some embodiments identify one or more categories and/or sub-categories in which each of those previously purchased products is associated. For example, a previously purchased product may be a gallon of 2% milk, which may be associated in the product database with a category of dairy products, while also associated with sub-categories of milk products, reduced fat milk products, 2% milk products, and/or other such sub-categories. The one or more filtering algorithms may select one or more of the sub-categories or categories to include in the listing. The rules may further take into consideration a frequency of variation in purchases within the one or more of the categories and/or sub-categories. For example, if a customer periodically purchases both 2% milk and 1% milk, the rules recognize the purchases different purchases within a first sub-category and broaden the number of products to be including in the filtered listing by using the corresponding first sub-category or a broader second sub-category or category that includes the first sub-category (e.g., products in the reduced fat milk sub-category). Other factors can be considered in applying the filtering and the selection of products to include in the listing.

The rules, in some embodiments, consider other factors such as location of the portable user device, one or more stores frequented by the customer, products on sale, products with a threshold sales rate, season of the year, quantities of products that the customer purchases, available quantity or quantities of one or more products, alternate products that may be purchased, other such factors, and typically a combination of such factors. For example, one or more rules may cause a retail store that the customer is near or is within a threshold distance, and include one or more products that are being highlighted at that store (e.g., products on endcaps, products on sale, products with a threshold sales rate, etc.). This store related factors may be further filtered by one or more customer factors (e.g., purchase history, preferences, etc.).

In some embodiments, the model training system 110 can further access a set of one or more model training rules and apply the set of model training rules to train one or more machine learning models that are to be communicated to and applied by the customer's portable user device in identifying one or more products from frames of video content captured by the portable user device. These training rules can limit the training of the one or more models to those products identified through the filter set of rules. Accordingly, in some implementations, the training is limited to the listing of products and corresponding image data for each of the products in the first listing of products. The trained machine learning model are communicated to the portable user device associated with the customer. In some embodiments, the one or more trained models are used to process the corresponding image data of the products in the filtered listing and generate numeric representations and/or multi-dimensional arrays representing images and/or labels of the products in the filtered listing of products. This numeric representations and/or multidimensional arrays can additionally be communicated to the portable user device for use in evaluating the processing of the frames captured by the portable user device.

Figure 6:
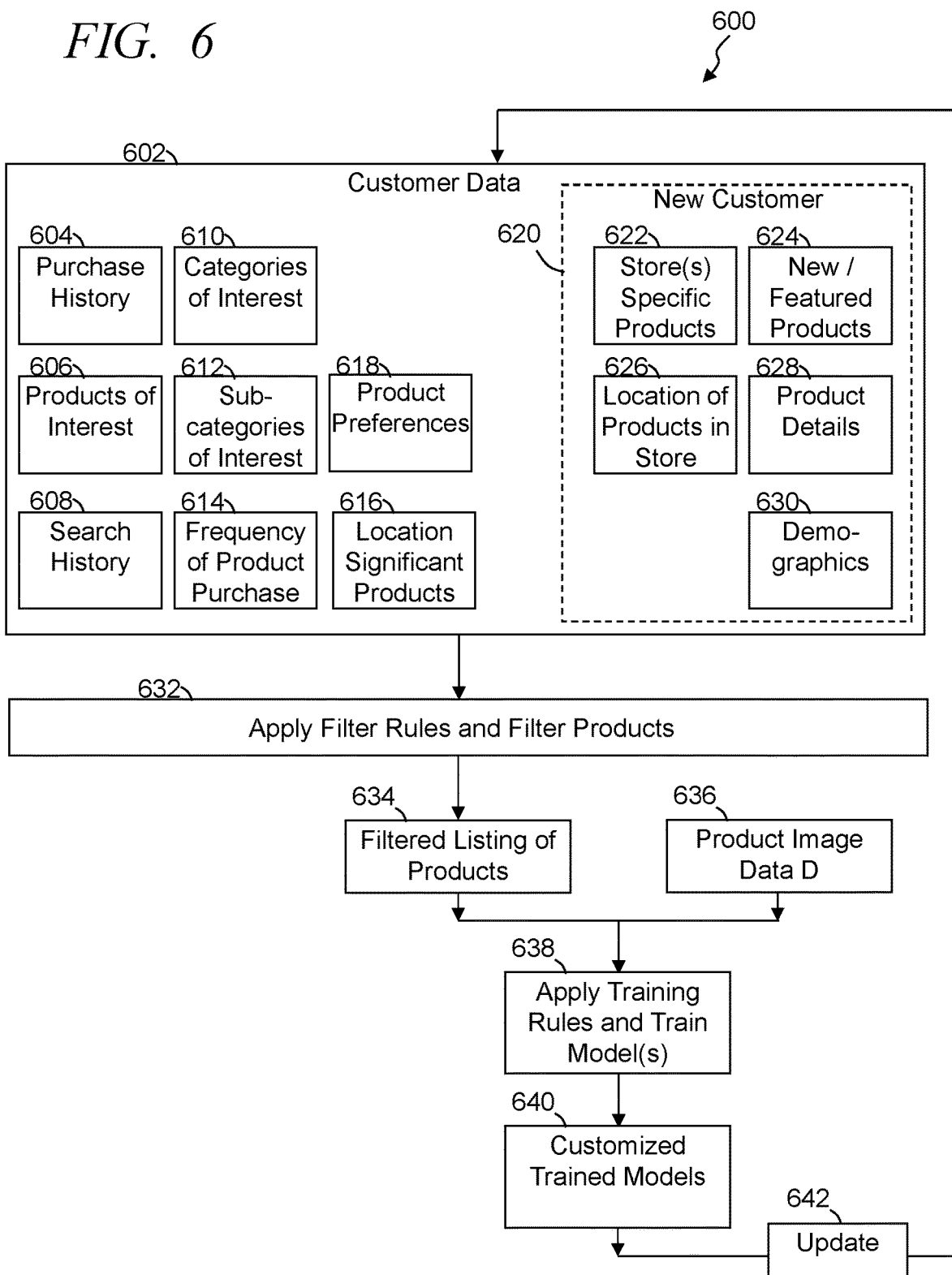
FIG. 6 illustrates a simplified flow diagraph of an exemplary process of customizing one or more machine learning models, in accordance with some embodiments.

FIG. 6 illustrates a simplified flow diagram of an exemplary process 600 of customizing one or more machine learning models, in accordance with some embodiments. Typically, the process 600 is implemented by the model training system 110. The model training system 110 accesses customer data 602, filtering information, parameters and/or other such data. This can include customer data specific to an identified customer, a collection, aggregate or collection of data corresponding to two or more customers, location information, retail store information, product information, inventory information, quantity information, store geographic location information, on-hand inventory information, sales frequency and/or rates of sales of products at retail stores, feature and/or on sale products information, prioritization information, other such information, or a combination of two or more of such information. For example, the filtering customer data 602 may include one or more of customer purchase history, 604, products of interest 606 for a customer, a customer's search history 608 of products search (e.g., through on-line searches), one or more product categories of interest information 610, product sub-categories of interest 612, product frequency of purchase information 614, geographically significant products information 616 corresponding to a geographic location where the customer currently is or is anticipated to be located, product preference information 618, and other such information. In some instances, a customer may be a new customer or there may be insufficient amounts of relevant information to use in filtering available products. Accordingly, some embodiments may additionally or alternatively access non-customer specific information 620. This non-customer specific information may include one or more of, but is not limited to, information about store specific products 622 for one or more stores (e.g., products being highlighted and/or strategically placed at a store, products on sale at a store, products relevant to a geographic location of a store, etc.), new products and/or featured products information 624, product location information 626, product details information 628 (e.g., product profile information, product vectorized characterization information, etc.), demographics information 630 (e.g., store demographic information, location demographic information, customer demographics for customers in a geographic area corresponding to a store, etc.), and/or other such information. Some embodiments may use non-customer specific information 620 in addition to customer specific information for a particular customer.

The model training system 110 accesses and applies filtering rules 632 using customer data 602, filtering information, parameters and/or other such data relative to the product information for the tens to hundreds of thousands of products or more available for purchase from the retail company to identify a filtered listing 634 of a limited number of products that the customer is predicted to more likely attempt to identify through image recognition implemented on the portable user device associated with the customer. For example, the rules may include rules to include in the filtered listing of products each product that was purchased through the retail company by the customer within the last year. As another example, the rules may dictate that for each product purchased by the customer within the last six months that is associated with a sub-category of products, that the filtered listing of products include the related products that are also associated with that sub-category. One or more of the rules may dictate that a location of the customer's portable user device be used to identify one or more retail stores within a threshold distance, identify featured products within each of those one or more stores, and incorporate those featured products into the filtered product listing. Further, one or more rules may be applied that access product preference information for a particular customer, identify products that correspond to the product preference information, and include those products into the listing of products 634. One or more rules may limit the number of products included in the filtered listing by applying priority ratings to products identified, and keep a threshold number of products in the listing 634 based on highest to lowest priority. The rules may define how products are prioritized, such as but not limited to most recently purchased are rated higher, frequency of purchase (e.g., more frequently purchased give higher rating, which may be added to other ratings for other priority factors), whether the product is in a current shopping list, quantity of a product purchased in a most recent purchase, an expected consumption rate and/or a date (e.g., closer to completely consuming may be given a higher priority), expiration of a product previously purchased (e.g., closer to expiration may be given a higher priority), rate of sale of products (e.g., products with greater rates of sale, and thus having greater demand, may be given higher priority), other such prioritizations, or combinations of two or more of such prioritizations. Again, the system may add, scale or otherwise combine priorities from different priority factors to generate a resulting priority. Additionally or alternatively, the applied set of rules result in filtering the products identified in the product database based on one or more of a location of one or more retail stores, rates of sales of one or more of the products at one or more retail stores, inventory levels and/or on-hand inventory of one or more of the products at one or more of the retail stores, other such factors, or a combination of two or more of such factors. For example, one or more rules may cause a confirmation that a particular store has a predefined threshold on-hand quantity, an on-hand quantity based on a predicted quantity a customer is expected to purchase, or other such on-hand quantity prior to incorporating the product into the resulting listing of products. Still further, some embodiments may apply one or more rules that evaluate an on-hand quantity relative to a current and/or predicted rate of sale, and determine whether a threshold quantity will be available at a store at one or more times in the future prior to including the product into the listing. Other rules may apply factors such as a store that a customer is visiting and/or expected to visit, on-hand inventory of products at that store, featured and/or on-sale products at that store, frequency of a sales of products at that store, product demand at that store, and/or other such factors. For example, a product may be excluded from a listing of products 634 when an on-hand quantity is less than a threshold.

The listing of products 634 often includes less than 2000 products, and in some instances includes less than 1000 products. Typically, a retail store offers tens of thousands of products. Accordingly, the listing of products 634 is significantly less than the number of products available from the retail company, and in some instances includes less than 1% of the products available.

The model training system utilizes the listing of products 634 to limit the training of the one or more models to the images and/or image data corresponding to those products in the listing. As such, the model training system obtains, from the product database, one or more images and/or product image data for each of the products identified in the listing. The one or more model training rules are applied 638 based on the limited images and/or image data corresponding to those products in the listing 634 to produce the one or more customized trained models corresponding to the customer, or group of customers.

The one or more machine learning models are typically repeatedly retrained over time. Accordingly, the model training system repeatedly update and retrain, over time, the one or more machine learning models to provide retrained machine learning models, and causes those updated and retrained machine learning models to be communicated to the respective portable user device associated with the customer. In some embodiments, the updated models are stored on the portable user device and replace corresponding one or more previously stored trained machine learning models on the portable user device.

In some embodiments, the repeated updating and retraining of the models can include reapplying 632, over time, the set of one or more filtering rules to the product database based on changes and/or updates to one or more of the types of information of the customer data 602 (e.g., filtering information, parameters and/or other such data), store information, change of store information, location information, inventory information, and/or other such information as described above relative to at least the filtering. For example, the retraining may be based on changes to one or more of the purchase history information 604, the search history information 608, the product preference data 618, and/or other such information corresponding to the customer. Based on the results of reapplying the set of filtering rules, an updated listing 634 of products is generated specific to the customer. A set of one or more model training rules can be accessed and reapplied 638 to retrain the one or more models. The retraining is typically limited to the updated listing of products 634. This retraining can be initiated based on a schedule, in response to a detected change, in response to a customer initiating a shopping experience, a notification that a customer is in a store or within a threshold distance of a store, other such triggers, or a combination of two or more of such triggers. For example, in some embodiments, the model training system, in repeatedly updating and retraining the one or more models, is configured to initiate the retraining in response to receiving a notification of a modification to one or more of the purchase history information 604, the search history information 608, the product preference data 618, and/or other customer data 602 corresponding to the customer. Similarly, in some embodiments, the model training system, in repeatedly updating and retraining the one or more models, is configured to initiate the retraining in response to receiving a notification that the portable user device associated with the customer is within a geographic threshold of a different second retail store that is at a geographic location that is different than a geographic location of another retail store (e.g., a retail store the customer typically visits). The listing of products can be updated to include an additional subset of products. This additional subset of products may be added to the listing, while in other instances may overwrite one or more products previously included in the listing. For example, the additional subset of products may include products relevant to at least one of the second retail store and the geographic location of the second retail store. Again, the subsequent retraining the one or more models can be limited to the updated listing of products that includes the additional subset of products.

As described above, in some implementations, one or more categories, sub-categories and/or other such groupings of products can be considered in filtering the potential available products to produce the resulting listing 634 relevant to a customer. In some embodiments, the model training system, in generating the listing of products specific to the customer, is configured to identify, for multiple products identified based on the result of filtering the product database, a product category corresponding to one or more products identified as relevant to the customer. Such a category and/or sub-category can include a set of a plurality of similar products defined as being part of the product category or sub-category (e.g., produce category, citrus produce sub-category, apples produce sub-category, etc.; non-alcoholic beverage category, cola sub-category, juice sub-category, water sub-category, etc.; and other such categories and/or sub-categories). Based on the category and/or sub-category of products, two or more products from each of the product categories can be included into the listing of products specific to the first customer. The inclusion into the listing may be based on one or more factors, such as but not limited to previous purchases, variations of previous purchases, pricing and/or whether a product is on sale, customer preferences, promotions, other such factors, and often a combination of two or more of such factors.

Additionally, the updating of the listing 634 may include appending additional products into the listing. Further, the updating may remove one or more products from the listing. As such, the model training system, in repeatedly updating and retraining one or more of the models, can be configured to identify that a first product, which was included in a most recent updated listing of products, has not been purchased by the customer within a threshold purchase period of time (e.g., within the last year, within the last 6 months, etc.), and update the listing of products to exclude the first product from the updated listing of products in response to identifying that the first product has not been purchased by the customer within the threshold purchase period of time. This threshold period of time may be dependent on the type of product, the quantities of product the customer previously purchased, the expected consumption rate of the product, a consumption rate typical for the customer (e.g., determined over time based on historic purchase rates), other such factors, or a combination of two or more of such factors. For example, the system may identify a first product, determine a most recent purchase date of the first product, determine a quantity of the first product purchased, identify a typical consumption rate by the customer of the first product, determine a predicted consumption date of the product based on the quantity of the product purchased and the consumption rate, determine that a threshold time has passed since the calculated consumption, and remove the first product from the listing when the threshold time has passed based on the time since the previous purchase. Again, the retraining of one or more of the models can be limited to the updated listing of products that excludes the products removed from the listing.

The updating over time of the one or more models can provide more current and more accurately trained models in attempts to accurately identify those products the customer attempts to identify through image recognition while reducing the processing overhead, memory overhead, and processing time at the customers portable user device. Some embodiments further confirming that one or more trained model stored on the portable user device are current. This confirmation may occur based on a schedule, in response to a request from the customer, based on detected changes and/or threshold changes to one or more of the filtering customer data 602, based on a detection of the portable user device entering a geographic area or being within a threshold of a geographic location, and/or other such factors or combination of such factors. For example, an application on the customer's portable user device, when authorized by the customer, may detect that the customer is within a threshold distance of a retail store, and initiate a communication from the probable user device of the versions of one or more of the trained models to the model training system. In other instances, the model training system may request the current versions from the portable user device. In some embodiments, the model training system is configured to receive a notification from the portable user device associated with the customer identifying a version of one or more of the stored machine learning model presently stored on the portable user device. The one or more versions can be evaluated to determine that the version of the one or more stored models is not the most recently updated version of the machine learning model, and cause a most recently updated version of one or more of the trained machine learning models to be communicated to the portable user device. As described above, this communication can be via one or more communication methods and/or protocols (e.g., cellular, Wi-Fi, Internet, etc.) over one or more communication and/or computer networks 108.

The respective portable user device 102 corresponding to a particular customer receives the one or more customized trained models 640 and can apply them when attempting to identify a product from image and/or video content captured by the imaging system 220 of the portable user device. Again, the customized modeling being restricted to the limited number of products identified through the filtering provides the customized models that have a reduced memory requirement, reduce processing overhead and provide results in a quicker amount of time than models trained based on most or all of the products available from the retail store and/or retail company. Further, reduced number of products identified in the listing enables the system to distribute a correspondingly limited quantity of the image data, numeric representations and/or multidimensional arrays representing images and/or labels of those products in the listing, which uses a significantly less quantity of memory on the portable user device. As described above, the system can further update 642 and/or retrain the models over time by repeating some or all of the steps of the process 600.

In some embodiments, the portable user device 102 stores the customized trained one or more machine learning models 640 in a local memory. The portable user device, in some implementations, further maintains a local product database locally storing sets of product imaging data for each set of the filtered subset of tens of retail products in the listing 634 and available for sale from the retail store and/or company. The image data, in some applications, includes a product identifier and at least image attribute data exclusively corresponding to the respective product. In response to an activation of the product recognition application by the customer and/or in response to capturing images while the application is active on the portable user device, the decision control circuit 224 can process each frame of a subset of one or more frames of the video content based on one or more modeling techniques implemented by one or more of the trained machine learning models 640 relative to corresponding one or more image attributes. Based on the processing corresponding one or more product identification probabilities that an item, captured within each of the subset of at least one frame, is estimated to be a first product of the first subset of tens of retail products is obtained. As described above, some embodiments evaluate aggregated identification probabilities. For example, the decision control circuit can determine an aggregated first identification probability of the first product as a function of a first product identification probabilities corresponding to the frames of a subset of at least one frame, and determine an aggregated second identification probability of the first product as a function of the second product identification probabilities corresponding to the frames of the subset of at least one frame. The aggregated first identification probability and the aggregated second identification probability of the first product for the frames of the subset of at least one frame can be collectively evaluated, and identify when one or more of the aggregated first identification probability and the aggregated second identification probability has a predefined relationship with a collective threshold probability. An image of the first product can be displayed in response to identifying that one or more of the aggregated first identification probability and the aggregated second identification probability has the predefined relationship with the collective threshold probability.

In those instances where a product attempting to be identified through the image and/or video content cannot be recognized, whether because it is a product that is not in the custom listing of products 634 or cannot otherwise be recognized because of one or more factors (e.g., portable device is moving too much, not capturing sufficient portion of the product, not capturing distinguishing portion(s) of the product, etc.), the application on the mobile device can inform the customer that the product could not be recognized and provide subsequent instructions. For example, the application may ask the customer whether the customer wants to communicate the image and/or video data to a remote server that has one or more models trained based on a larger quantity or substantially all of the products available from the retail store to perform additional processing to try to identify the product remote from the portable user device.

Figure 7:
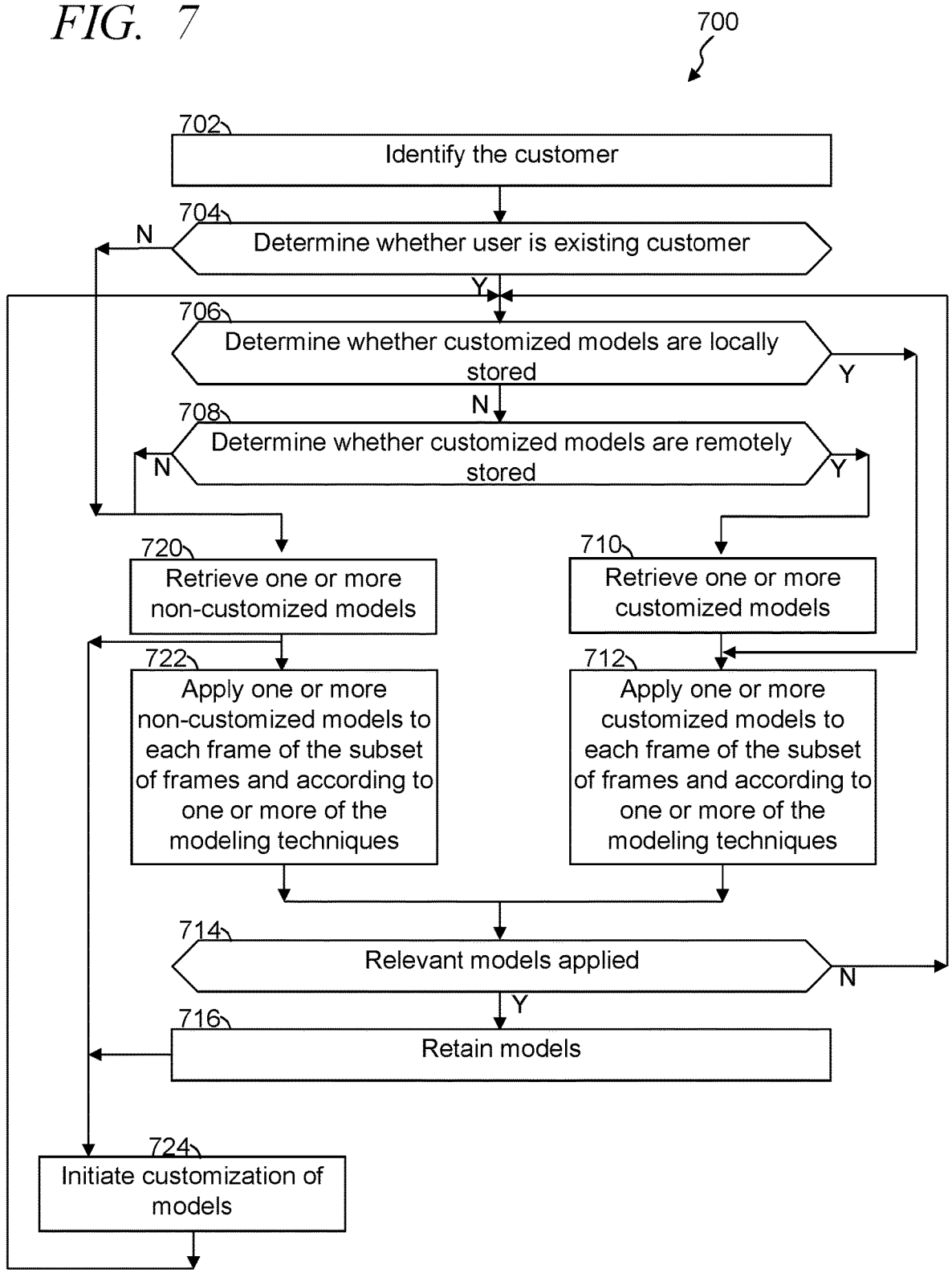
FIG. 7 illustrates a simplified flow diagram of a process of initiating the application of one or more models on the portable user device, in accordance with some embodiments.

FIG. 7 illustrates a simplified flow diagram of a process 700 of initiating the application of one or more models on the portable user device 102, in accordance with some embodiments. In step 702, the customer is identified. This may be based on an identifier stored within the portable user device, supplied by the customer (e.g., through a log-in process, activation process, etc.), or the like. In step 704, it is determined whether the identified customer is an existing customer and/or has previously utilized the product identification application. This may be based on whether a customer profile for the identified customer is available on the portable device and/or accessible at a remote server and/or database. When the customer is an existing customer, the process 700 advances to step 706 to determine whether one or more customized trained models 640 are stored local on the portable user device and/or are most current trained models. When customized trained models are locally stored the process advances to step 712. Alternatively, when customized trained models are not locally stored and/or more recently updated models are available, the process can advance to step 708 to determine whether customized models and/or more recently updated models are accessible from a remote source (e.g., remote customer database, remote server, etc.).

When trained models are available for the customer from the remote source, the process advances to step 710 where the trained models are retrieved and locally stored on the portable user device. For example, the portable user device may download the trained models from central server 106 and/or the model training system 110. In step 712, one or more locally stored trained models are applied to each frame of a subset of frames in accordance with one or more respective modeling techniques to obtain one or more identifiers of a product and corresponding probabilities.

In some embodiments, the process 700 includes step 714 where it is determined whether one or more additional models are to be applied to one or more frames of the image and/or video content. When further models are to be applied the process can return to an earlier step, such as step 706 to determine whether further customized models are to be applied. Further, the process can optionally include step 716 where one or more trained models are retained and locally stored on the portable user device.

When it is determined in step 704 that the identified customer is not an existing customer and/or has not previously utilized the product identification application, the process advances to step 720. Similarly, in some embodiments, when it is determined in step 708 that customized models and/or more recently updated models are not accessible from a remote source, the process advances to step 720. In step 720, one or more non-customized models and/or one or more models that are more generally customized (e.g., customized based on one or more groups, customized based on a particular store, customized based on a geographic area, and/or otherwise customized at a more general level than specific to a particular customer) are locally accessed and/or retrieved from a remote source. In step 722, one or more locally stored models are applied to each frame of a subset of frames in accordance with one or more respective modeling techniques to obtain one or more identifiers of a product and corresponding probabilities. Some embodiments further include optional step 724 where customization of the training of one or more models can be initiated at the remote model training system and/or partially or fully performed locally on the portable device. This initiation of customization of training may utilize one or more product identifiers, image data and/or other such data obtained based at least in part on the products identified through the image recognition process at least in part to customized training and/or filtering to generate the listing used in customized training.

Figure 8:
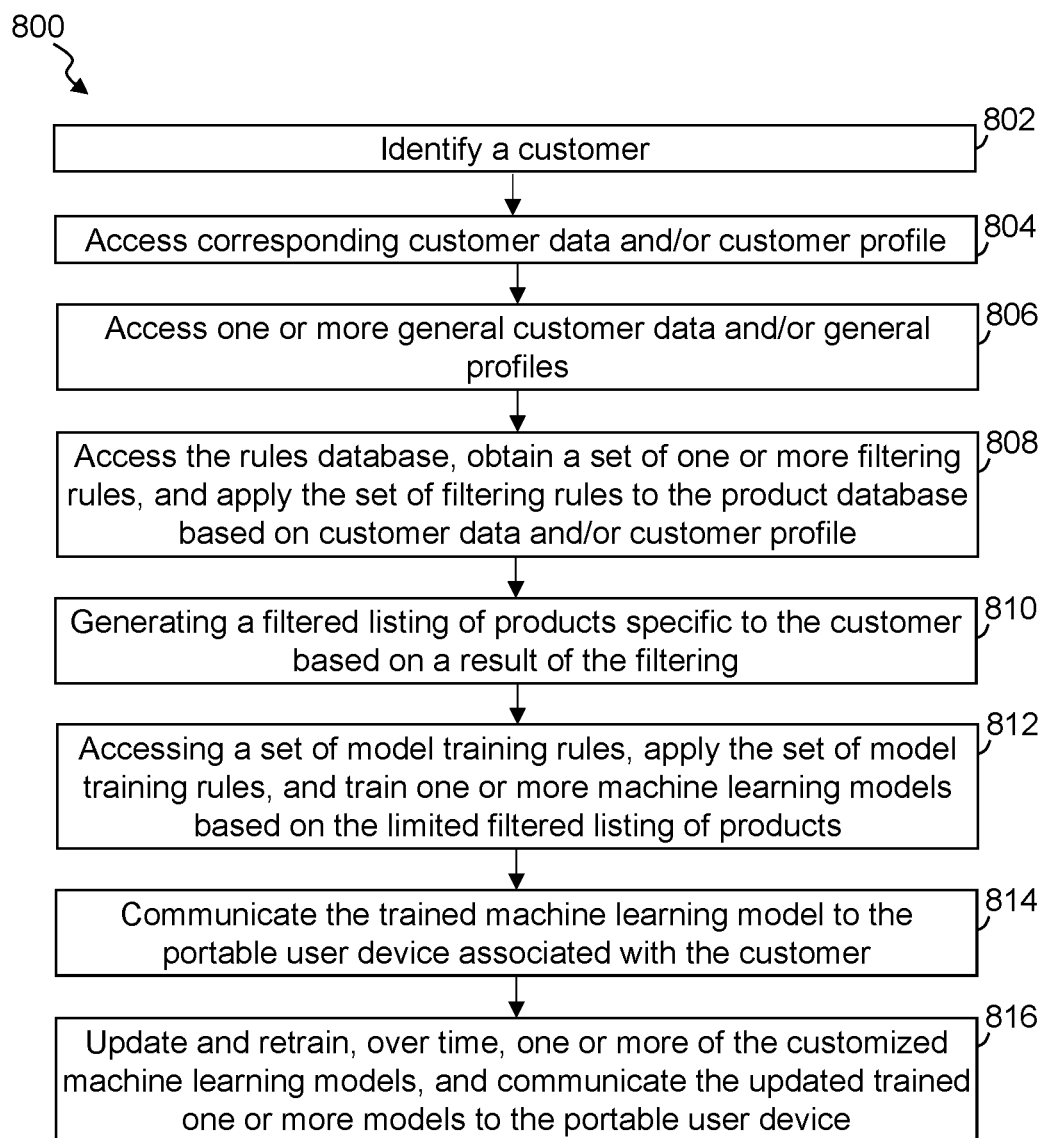
FIG. 8 illustrates a simplified flow diagram of a process of training models for use in recognizing retail products in a physical retail store, in accordance with some embodiments.

FIG. 8 illustrates a simplified flow diagram of a process 800 of training models for use in recognizing retail products in a physical retail store, in accordance with some embodiments. Further, in some embodiments, the process 800 is implemented at least partially by the model training system 110 that is communicatively coupled with the product database and the customer database. In step 802, a customer is identified of the plurality of customers. This identification may be identifying a previously registered customer that has authorized and/or opted in to participate in using the application on their portable user device to recognized products through image recognition and authorized the customization of the training of models based on information specific to that customer and tracked and maintained by the retail store or retail company. In other instances, the identification may include identifying that the customer has not previously registered and/or has not authorized the customized training of models specific to the customer.

In step 804, a first customer profile is accessed in the customer database associated with the first customer when a customer profile is available for the identified customer. Some embodiments include optional step 806 where one or more general or generic customer profiles are accessed. These general or generic profiles may be used based on an aggregation and/or statistical processing of information for multiple other registered customers. For example, profiles of customers that shop at a particular store may be used to generate a general customer profile that is relevant to shopping at that store. As another example, information in profiles of customers living in geographic area and/or threshold distance of the identified customer may be aggregated and/or statistically processed to generate a general profile for customers that live in a geographic area. In another example, customers associated with a demographic may be identified and information from profiles of these customers can be used to generate a general demographic profile that can be used for customers matching that demographic. Again, customers have to authorize having have their customer profiles used for such generalizations. Similarly, a customer would have to authorize a general profile used to customize the training of one or more models.

In step 808, one or more rules databases are accessed to obtain a set of one or more filtering rules that are applied to product information. Typically, the rules are applied products in the product database. Further, the rules are applied to filter the product information and/or products identified in at least the product database based on customer data 602 and/or other such parameters. For example, the rules are applied based on one or more of purchase history information 604, search history information 608, product preference data 618, store geographic location information, on-hand inventory information, sales frequency and/or rates of sales of products at retail stores, feature and/or on sale products information, other such information, or a combination of two or more of such information corresponding to the first customer. The customer data can be specific to the first customer to provide more accurate results relative to that customer. More generic and/or general customer data can additionally or alternatively be applied. In step 810, a listing 634 of products specific to the first customer is generated based on result of filtering the product database based on the customer data 602. In some embodiments, the listing comprises a first subset of tens of retail products, of the tens of thousands or more of the retail products available from the retail store, and that the customer is predicted to attempt to identify through image recognition implemented on a portable user device associated with the first customer.

In step 812, a second set of model training rules are accessed and applied in training one or more machine learning models that are to be provided to and subsequently applied by the portable user device in identifying one or more products from frames of image and/or video content captured by the portable user device. Further, this model training can be limited to the listing of products 634 and corresponding image data for each of the products in the listing of products. In step 814, the one or more trained machine learning models are communicated to the portable user device associated with the first customer.

In step 816, the one or more trained machine learning models are updated and/or retrained one or more times. This updating and retraining can be performed over time to continue to update the trained models. The updated trained models can be communicated to the portable user device associated with the first customer to replace a previously stored trained machine learning model on the portable user device. In some embodiments the repeated updating and retraining of the one or more machine learning models can include reapplying, over time, the set of filtering rules to the product database based on updates to one or more of the customer data 602 (e.g., the purchase history information, the search history information, the product preference data, other such data, or combination of two or more of such data) corresponding to the first customer. An updated listing of products specific to the first customer can be generated based on results of reapplying the set of filtering rules relative to current and/or modified customer data. Accordingly, the retraining of the one or more models can include accessing the set of model training rules, reapplying the set of model training rules, and retraining the one or more machine learning models limited to the updated listing of products. The one or more retrained machine learning models can be communicated to the portable user device for subsequent use in identifying products.

Further, in some instances, the updating and retraining of the one or more the machine learning models can be initiated in response to a modification to one or more of the customer data, such as a modification to one or more of the purchase history information, the search history information, and the product preference data corresponding to the first customer. Additionally or alternatively, the updating and retraining of one or more of the machine learning models may be initiated in response to the model training system and/or the central server receiving a notification that the portable user device associated with the first customer is within a geographic threshold of a second retail store that is at a second geographic location that is different than a first geographic location of a first retail store (e.g., a store the customer more regularly visits. The listing of products 634 can be updated to include a second subset of products, wherein the second subset of products comprises products relevant to at least one of the second retail store and the geographic location of the second retail store. Further, the retraining the one or more machine learning models can be limited to the updated listing of products that includes the second subset of products.

Some embodiments, in generating the listing of products specific to the first customer in step 810, further identify, for multiple products identified based on the result of filtering the product database, a corresponding product category comprising a set of a plurality of similar products defined as being part of the product category, and including two or more products from each of the product categories into the listing of products specific to the first customer. Some embodiments may remove product from listing over time. For example, in some embodiments, the updating and retraining of the one or more machine learning model can include identifying that a first product, which was included in the most recent updated first listing of products, has not been purchased by the first customer within a threshold purchase period of time. The subsequent updating of the listing of products can include excluding the first product from the updated listing of products in response to the identification that the first product has not been purchased by the first customer within the threshold purchase period of time. Again, the corresponding, subsequent retraining of the one or more machine learning models can be limited to the updated listing of products that excludes the first product.

Some embodiments, in step 814 and/or in a step parallel to step 814, optionally receive a notification from the portable user device associated with the customer that identifies a version of one or more stored trained machine learning models presently stored on the portable user device. The model training system and/or central server can determine whether the versions of the stored one or more machine learning models is not the most recently updated version of the machine learning model. When it is determined that the versions of the one or more stored multiple machine learning models are not the most recently updated version, the system can cause the communication of the most recently updated version of one or more of the trained machine learning models to the portable user device.

The portable user device can use the customized trained models to locally identify products based on images captured by the portable user device, without having to communicate the images to a remote device. In some embodiments, the decision control circuit 224 of the portable user device 102 can process each frame of a subset of one or more frames of a video content, captured by an imaging system 220 of the portable use device, by at least a first modeling technique implemented by one or more of the trained machine learning models relative to a first image attribute, and obtain a corresponding first product identification probability that an item, captured within each of the subset of at least one frame, is estimated to be a first product of the first subset of tens of retail products for which the one or more products are trained. Further, in some instances, each frame of the subset of at least one frame can be processed by a second modeling technique implemented by one or more of the trained machine learning models relative to a second image attribute that is different than the first attribute, and obtain a corresponding second product identification probability that the item, captured within each of the subset of at least one frame, is estimated to be the first product of the first subset of tens of retail products. An aggregated first identification probability of the first product can be determined as a function of the first product identification probabilities corresponding to the frames of the subset of at least one frame. Similarly, an aggregated second identification probability of the first product can be determined as a function of the second product identification probabilities corresponding to the frames of the subset of at least one frame. The aggregated first identification probability and the aggregated second identification probability of the first product can be collectively evaluated for the frames of the subset of at least one frame to identify when one or more of the aggregated first identification probability and the aggregated second identification probability has a predefined relationship with a collective threshold probability. The decision control circuit can cause an image of the first product to be displayed in response to identifying that one or more of the aggregated first identification probability and the aggregated second identification probability has the predefined relationship with the collective threshold probability.

In some embodiments, the system analyses a customer's purchase history, preferences, search history and/or other relevant customer information in an attempt to identify predict products that the customer will likely attempt to identify through image recognition and/or purchase. By identifying a set of products that the customer is likely to attempt to identify through the image recognition, the system can provide more focused training of models to produce more efficient, smaller trained models that operate with reduced processing overhead and use less memory of the portable user device. Such focused and limited training is based, in part, on a customer data 602, and typically customer data specific to that customer, such as but not limited to the customer's purchase history to predict products that the customer is expected or may likely to attempt to identify through image recognition and/or purchase. By selecting a subset of the products available for purchase in and/or through the retail store that is focused on customer data corresponding to the customer (e.g., purchase history, search history, preferences, frequency of purchase, variations in purchases, categories, etc.), the system can train more effective machine learning models (e.g., computer vision models) that can be applied local on the portable user device to recognize those products that are important to a given customer and/or predicted to be products that the customer is more likely to attempt to identify through image recognition and/or purchase. By customizing the training of one or more models, the system can scale a multi-model image processing system to more effectively recognize products, of the tens of thousands of products available through the retail company, that are more relevant to the customer, and greatly reduce processing and memory overhead by avoiding the training based on products the customer is unlikely to consider and/or attempt to identify through image recognition. The system can distil the total number of products into a focused and limited list of products that is personal to each customer.

The customized training can be based on customer data (e.g., purchase history, search history, etc.) with a model output decision engine to avoid having the system support the recognition of tens of thousands of products, and instead focus the training on those products relevant to the individual customer (or group of customers), and be able to recognize the products that the customer is more likely to be interested in, consider for purchase, cared about, and/or purchase. The recognition does not have to be 100% accurate or be able to recognize 100% of the products. The system instead attempts to improve efficiency through the anticipation of products the customer is predicted to attempt to identify through the image recognition. Accordingly, the customized training and personalization of the relevant one or more models in a multi-model product recognition system, satisfies the goal of recognizing substantially all if not all of the products that a particular customer would attempt to identify and/or scan. The more customer data available relative to a particular customer, the more effective the system is going to be at filtering the products to generate a more accurate filtered listing that is used to provide more effective and efficient trained models. Still further, the reduced numbers of products to be used in training the one or more products can greatly reduce the time to train those models. This reduced training time, in part, further enables more updating and the distribution of models that are trained based on the most recent customer data.

Figure 9:
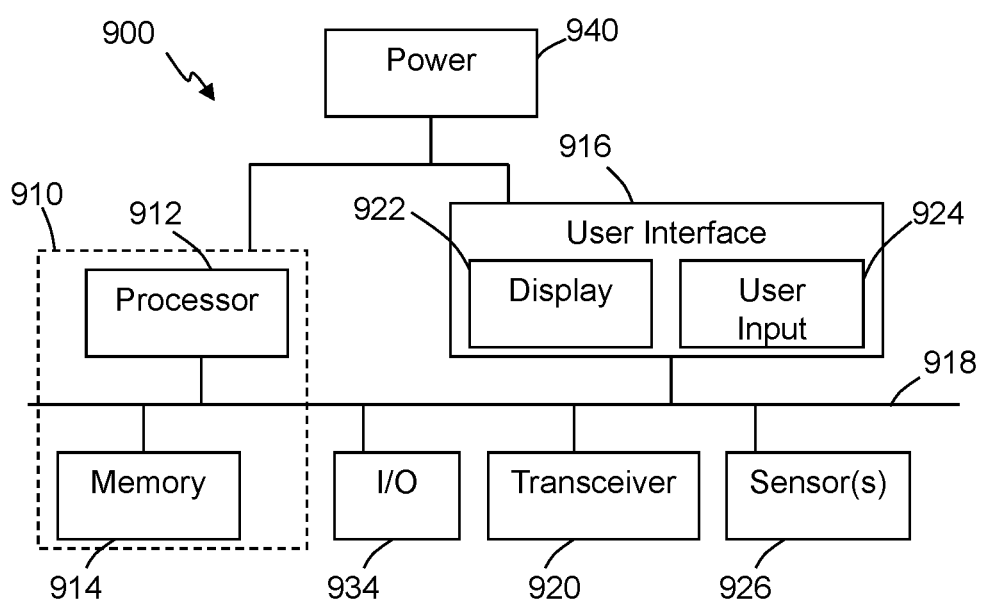
FIG. 9 illustrates an exemplary system for use in implementing methods, techniques, devices, apparatuses, systems, servers, sources to identify objects and products, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 9 illustrates an exemplary system 900 that may be used for implementing any of the components, circuits, circuitry, systems, functionality, apparatuses, processes, applications, and/or other above or below mentioned systems or devices, or parts of such circuits, circuitry, functionality, systems, apparatuses, processes, or devices. For example, the system 900 may be used to implement some or all of the portable devices 102, the central server 106, the model training systems 110, the control circuit 202 of a portable device 102, the imaging system 220 of the portable device, the image processing circuit 222, the decision control circuit 224, and inventory system, and/or other such components, circuitry, functionality and/or devices. However, the use of the system 900 or any portion thereof is certainly not required.

By way of example, the system 900 may comprise a control circuit or processor module 912, memory 914, and one or more communication links, paths, buses or the like 918. Some embodiments may include one or more user interfaces 916, and/or one or more internal and/or external power sources or supplies 940. The control circuit 912 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 912 can be part of control circuitry and/or a control system 910, which may be implemented through one or more processors with access to one or more memory 914 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 900 may be used to implement one or more of the above or below, or parts of, components, circuits, systems, processes and the like.

The user interface 916 can allow a user to interact with the system 900 and receive information through the system. In some instances, the user interface 916 includes a display 922 and/or one or more user inputs 924, such as buttons, touch screen, track ball, keyboard, mouse, etc., which can be part of or wired or wirelessly coupled with the system 900. Typically, the system 900 further includes one or more communication interfaces, ports, transceivers 920 and the like allowing the system 900 to communicate over a communication bus, a distributed computer and/or communication network 108 (e.g., a local area network (LAN), the Internet, wide area network (WAN), etc.), communication link 918, other networks or communication channels with other devices and/or other such communications or combination of two or more of such communication methods. Further the transceiver 920 can be configured for wired, wireless, optical, fiber optical cable, satellite, or other such communication configurations or combinations of two or more of such communications. Some embodiments include one or more input/output (I/O) ports 934 that allow one or more devices to couple with the system 900. The I/O ports can be substantially any relevant port or combinations of ports, such as but not limited to USB, Ethernet, or other such ports. The I/O interface 934 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 926 to provide information to the system and/or sensor information that is communicated to another component. The sensors can include substantially any relevant sensor, such as accelerometer sensor, light sensor, distance measurement sensors (e.g., optical units, sound/ultrasound units, etc.), and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 900 comprises an example of a control and/or processor-based system with the control circuit 912. Again, the control circuit 912 can be implemented through one or more processors, controllers, central processing units, logic, software and the like. Further, in some implementations the control circuit 912 may provide multiprocessor functionality.

The memory 914, which can be accessed by the control circuit 912, typically includes one or more processor-readable and/or computer-readable media accessed by at least the control circuit 912, and can include volatile and/or nonvolatile media, such as RAM, ROM, EEPROM, flash memory and/or other memory technology. Further, the memory 914 is shown as internal to the control system 910; however, the memory 914 can be internal, external or a combination of internal and external memory. Similarly, some or all of the memory 914 can be internal, external or a combination of internal and external memory of the control circuit 912. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network 108. The memory 914 can store code, software, executables, scripts, data, content, lists, programming, programs, log or history data, user information, customer information, product information, and the like. While FIG. 9 illustrates the various components being coupled together via a bus, it is understood that the various components may actually be coupled to the control circuit and/or one or more other components directly.

In some embodiments, the system is configured to reduce the use of or remove the remote server processing and instead locally perform the analysis and recognition through image processing in real-time by applying multiple machine learning modeling. This provides minimal latency, faster recognition, and does not require network connectivity (or use of a customer's data limits). The system further improves image recognition, in part, through the evaluation of accelerometer data to determine whether the user device is positioned properly to capture a good video of an object and to select one or more appropriate frames so that the input to the models is valid and accurate. Further, the invention provides an additional layer of analysis to create a believable result. The system takes raw output from one or more of the machine learning models over a series of one or more input frames, analyzes the series of inputs, and compiles the results of the one or more models in real-time into a singular aggregate result providing more accurate result. The aggregation significantly reduces false positives in the machine learning models and results in a much higher accuracy in the results than when a single model was used alone. In some implementations, the system is configured to simultaneously perform image, bar and text/QR code recognition to identify products and/or confirm an identification of a product. The system can operate with live video data and does not have to rely/utilize a singular image Some embodiments further utilize an application (APP) on the portable device to track products identified and/or products the user (e.g., worker, customer, etc.) intends to purchase, and can keep a running total of the products intended to be purchased. This pricing information can be acquired in response to identifying the product through the multi-modeling image processing system. For example, a shopping application can include an option to capture an image or scan a product, which activates the camera on the mobile device. Feedback may be provided to the user as the video content is captured (e.g., unstable, directions to move up, down, left right, back and/or forward, notification of whether there is a barcode detected, etc.). In some applications, the camera may be launch by default in a barcode scan mode, while in other instances may perform some preliminary evaluation to detect there is no barcode present. Other feedback may be provided (e.g., using static scan brackets, illustrated arrows for direction the user is to move the device, etc.). For example, the brackets can be animated to help the user hone into the label, barcode, and/or other information more likely to provide a more accurate identification. An "Image Scan" option may be displayed to initiate the processing of the multiple subset of frames. Similarly, other feedback may be provided such as a tip/message to "Point at a product", which may remain if the user is moving the portable device too much and/or an image is not in focus. Once a product is in focus the tip/message may be removed. Additional or alternative feedback may be provided indicating the processing of the frames, and/or provide the user with an option to scan the product instead of a barcode (e.g., animated series of dots rotating with product edge detection) to show scanning is occurring).

The multi-modeling evaluation of the subset of frames can return identifying information (e.g., name, size, image, cost, barcode number, etc.) and/or other information (e.g., nutritional information, related products, links to recipes and/or related products, etc.). Some embodiments offer some type of confirmation of recognition and/or a probability (e.g., a percentage, an illustrated scale (e.g., multicolored bar scale), etc.) that the correct product was scanned and identified. This notification and/or identifying information may continue to be displayed until a user selects one or more options (e.g., "add to cart", "Incorrect Item", selecting a number of that identified product to be purchased (e.g., selecting a displayed number, selecting a "+" or "−" displayed option, selecting a "Add to Cart" option numerous times, etc.), selecting an "Undo" option, etc.). This can trigger the APP 104 to advance to allow the user to select a subsequent product. Some embodiments may additionally request the user provide additional input when an incorrect item is identified and/or when multiple products are identified (e.g., the system is unable to achieve a threshold consistency of one product). For example, if the user selects a displayed "Incorrect" or "UNDO" displaced option, the APP may offer one or more options for the user to provide feedback as to why user decided not to add the item to a virtual shopping cart (e.g., displaying options such as "Wrong Item", user changed his/her mind, etc.). This may disappear after a selection or after a predefined period of time (e.g., N seconds). An item count indication and/or price and/or total indicator can be updated on the displayed interface (e.g., a sticky subtotal bar). Additionally or alternatively, a listing and/or images of similar items found may be displayed with options to select one or more of these (e.g., offer multiple selections if similar form factors were recognized and probability accuracy was less than a threshold (e.g., system could not distinguish if the item was a large or small case of a product)). In some instances, the APP may further display a "None of These" option or other similar option or otherwise touches the display screen outside the list of products.

Some embodiments may provide additional or alternative feedback, such as when an object cannot be recognized within a desired level of accuracy. For example, a display may be presented to the user that the product could not be recognized. This may include requesting the customer scan the barcode or to move the camera to a different orientation relative to the product. Similarly, an option to initiate a barcode scan may be provided, which in response may initiate display of one or more alignment indicators (e.g., static scan brackets) to guide the user and/or animate instructions to hone into the barcode. An option of "no barcode" may be presented when the user cannot locate a barcode or a barcode is not accessible. Once a barcode is detected an "Scan the barcode message" may disappear and/or an indication of processing may be displayed.

Once the barcode is recognized a confirmation may be provided of the product that was recognized from the barcode. Again, the user may be presented with options (e.g., "Add to Cart", numbers of items to add, "Undo", etc.). This may disappear in n seconds. Some embodiments may further display an item count, pricing, and/or other information, and if selected to purchase update the cart, total cost, number of products, etc. (e.g., updated on a sticky subtotal bar). Some embodiments may add a delay/pause prior to allowing a subsequent scan to avoid accidental scans of the same product.

In some embodiments, the system provides further guidance when an "Image" scan operation is displayed, such as providing instructions, animation or the like to help capture frames that can be used. This may be activated after a threshold period of time. The APP 104 may provide other displayed options, such as a "check-out" option to initiate purchases of collected products, an view cart option to see what products the customer has selected and/or otherwise indicated to be purchased, a budget option to see how the cost affects a budget, a shopping list option to see what products the customer intends to purchase and/or that have not yet been obtained during the shopping trip, and/or other such options. Further, some embodiments automatically initiate a purchase of products through a communication, from the portable device 102 to one or more of the point of sale systems 118, of the product identifying information of products within the virtual cart.

Some embodiments confirm the accuracy of the virtual cart through tracking product identifies such as RFID tags read by one or more RFID tags within the retail store and/or proximate a point of exit of the retail store, detecting product identifying information (e.g., bar codes, image processing of cameras of the retail store that are separate from the camera of the portable device 102, other such methods, or a combination of two or more of such methods. Based on the evaluation of products, the central server 106, inventory system 114 or other relevant system may identify that products physically retrieved by a customer (e.g., in a customer's physical cart, basket, etc.) are inconsistent with the products identified in the customer's virtual cart and/or numbers of products are inconsistent. Based on the detected inconsistency, the central server 106, inventory system 114 or other system can communicate a notification to the portable device to be presented to the customer, such as through a pop-up on a display, through an audible notice, through the APP, other such method or a combination of two or more of such methods. In some embodiments, the inconsistency can further be communicated to one or more point of sale systems to notify the customer through the point of sale system of the inconsistency. In some applications, for example, a point of sale system 118 being used to complete the purchase of the products can communicate a notification to the central server 106, the inventory system 114 and/or other system of the pending purchase. The notification can include an identification of the virtual cart and/or the customer making the purchase and receive the notification of inconsistencies in response to the notification of the pending purchase. In some instances, the notification of the pending purchase can include a listing of products to be purchased to allow a confirmation between the physical products and the products identified in the virtual cart and the quantities of those products.

Accordingly, some embodiments provide systems and methods of purchasing one or more products once recognized through the image product recognition and/or other methods of identifying and/or confirming an identification of product. In some embodiments, the systems and/or methods enable purchasing of one or more products using a portable device 102. Product identification information is captured by and/or inputted into the portable device 102 that identifies the product for purchase. The product may be added to a virtual cart and/or an order may be generated from one or more products identified by the identification information. Some embodiments obtain an optical machine-readable identifier, code or the like that exclusively identifies the order, which can be used to retrieve the order information specifying product identifying information that can be used by a point of sale system 118 to obtain pricing for each product in the order. Accordingly, in some implementations, the optical machine-readable identifier is a representation of the order.

Some embodiments provide one or more computer readable memory mediums comprising program instructions to enable purchasing of one or more product using a portable device 102 that includes one or more imaging systems 220 (e.g., one or more digital cameras) and/or other scanning module or system. The program instructions are executable by a processor to capture an image of a product and/or an identifying portion of a product and process the image to obtain identification information that is used to identify the product. In some embodiments, the program instructions are also executable by a processor to generate a virtual shopping cart containing product information representing the product. The product information is retrieved using the identification information.

Further, in some implementations, program instructions are executable by a processor to initiate a payment transaction through a point of sale system 118, which may be a stand-alone point of sale system, implemented within the central server 106, implemented in a remote server, or the like, of the products in the virtual cart. In some embodiments, a customer has the option of paying for the order of the products in the virtual cart by providing a cashier with an optical or other machine-readable representation of an order identifier, order number or the like identifying an order. The machine-readable representation of the order, in some implementations, can be displayed on a display of the portable device 102 to be scanned at a point of sale system, wirelessly transmitted from the portable device to a point of sale system, or the like. In some embodiments, the portable device may additionally or alternatively transmit payment information directly from the portable device to a point of sale system 118, communicate instructions to a point of sale system 118 directing the point of sale system to access a payment method for the customer (e.g., accessing a customer profile associated with that customer), provide customer identifying information to the point of sale system enabling the point of sale system to retrieve payment information, or other such methods of obtaining payment. In this manner, a user can save time by not having to remove products from a shopping cart for scanning at a traditional cashier or a self-checkout station, and in some implementations, the user can save additional time by bypassing the traditional cashier or self-checkout station completely and paying for an order directly with the mobile device.

Figure 10:
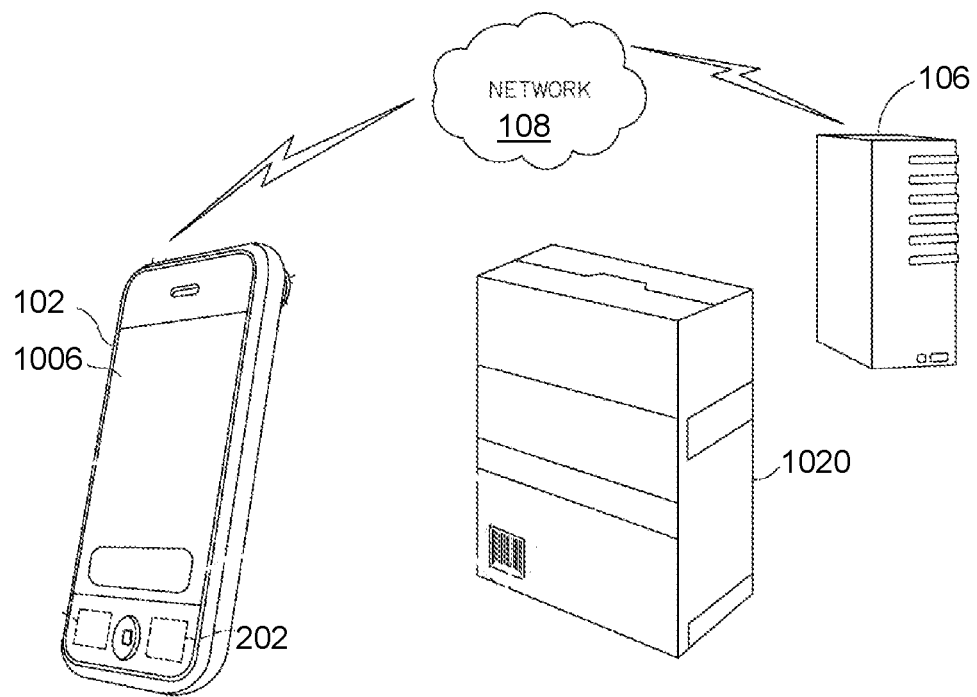
FIG. 10 depicts an illustration of an exemplary portable device receiving identification information from images of a product and communicating with a server, in accordance with some embodiments.

With reference to FIG. 10, illustrated is an exemplary representation of a portable device 102 identifying a product 1020, which may be selected for purchasing at a retail store or other retail establishment. As described above, in some embodiments, the portable device 102 includes a control circuit 202 for executing applications, a display 1006, one or more transceivers and an imaging system and/or other scanning module. The imaging system captures one or more images that are used to identify the product 1020 and/or capture identification information of the product as described above. The portable device 102 is configured to communicate with another devices, such as the remote central server 106, one or more point of sale systems 118, one or more inventory systems 114, other portable devices, and/or other devices via one or more computer and/or communication network 108.

Figure 11:
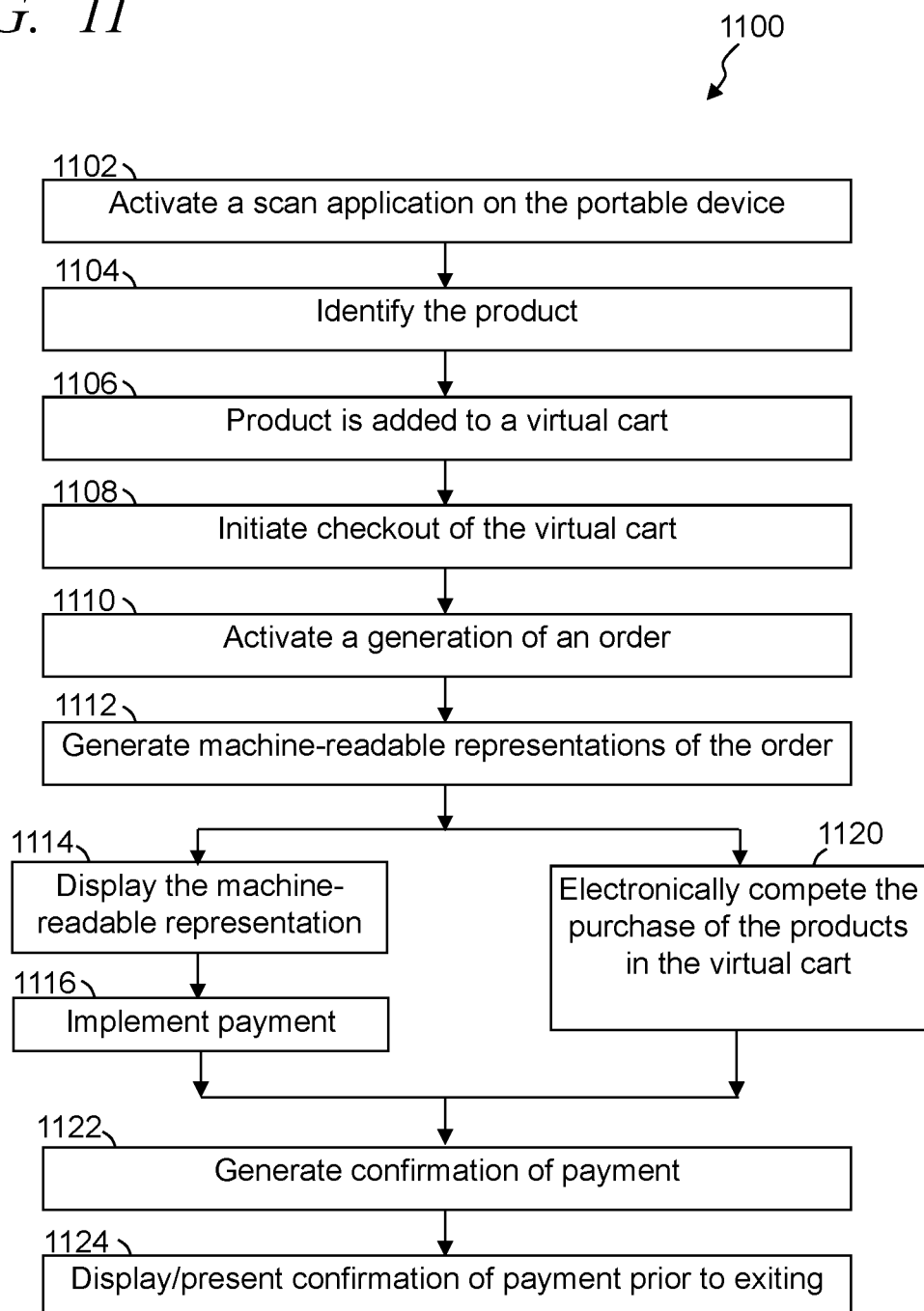
FIG. 11 illustrates a simplified flow diagram of a process of adding products to a virtual shopping cart, and completing a purchase of the one or more products of the virtual cart, in accordance with some embodiments.
Figure 12:
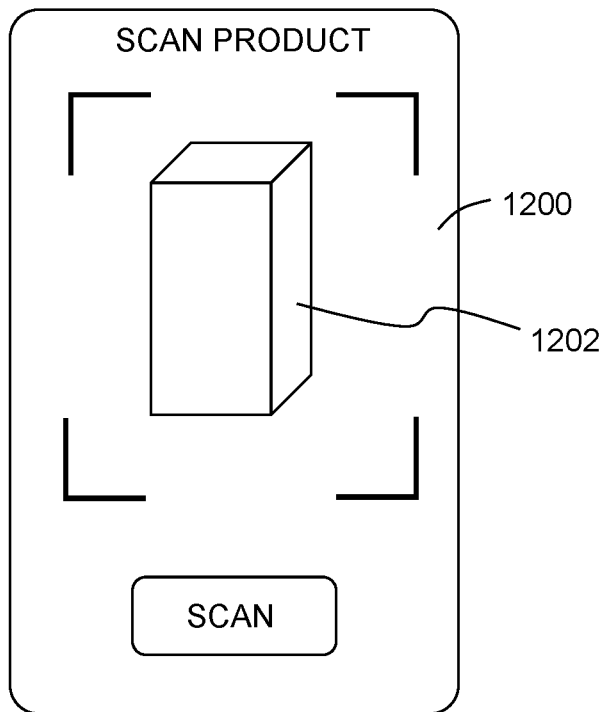
FIG. 12 illustrates an exemplary scan interface in accordance with some embodiments.

FIG. 11 illustrates a simplified flow diagram of a process 1100 of adding products to a virtual shopping cart, such as based on recognition of the products from one or more images, scanning of a barcode, etc., and completing a purchase of the one or more products of the virtual cart, in accordance with some embodiments. The process, in some implementations, can be utilized as part of a SCAN & GO application and system operated by a retailer. In an optional step 1102, a user can activate a scan application on the portable device 102. This application in part provides one or more graphical user interfaces that are displayed on a display of the portable device to allow the user to implement one or more actions associated with identifying a product, adding a quantity of the product to a virtual cart, and paying for the one or more products added to the virtual cart. FIG. 12 illustrates an exemplary scan interface 1200 in accordance with some embodiments that is provided to enable the customer to capture an image of a product 1202.

Figure 13:
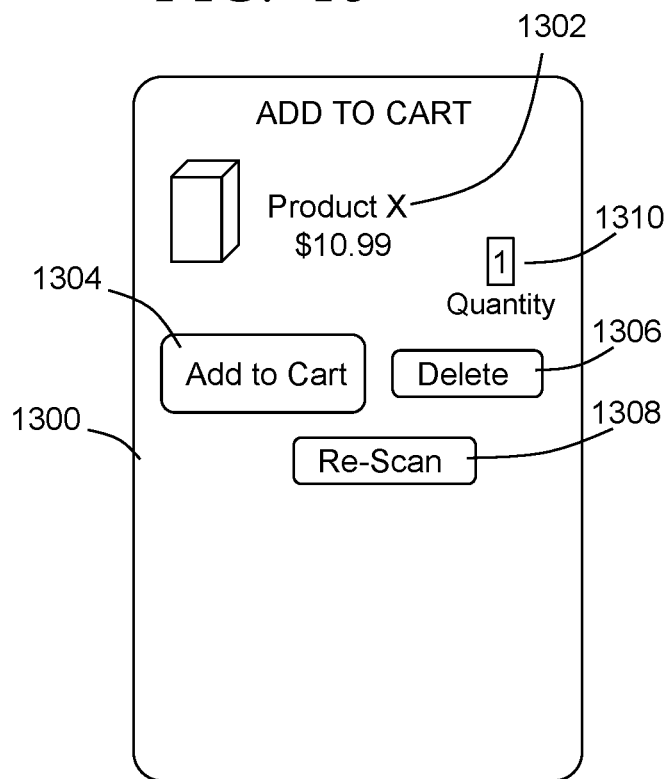
FIG. 13 illustrates an exemplary cart confirmation user interface, in accordance with some embodiments.
Figure 14:
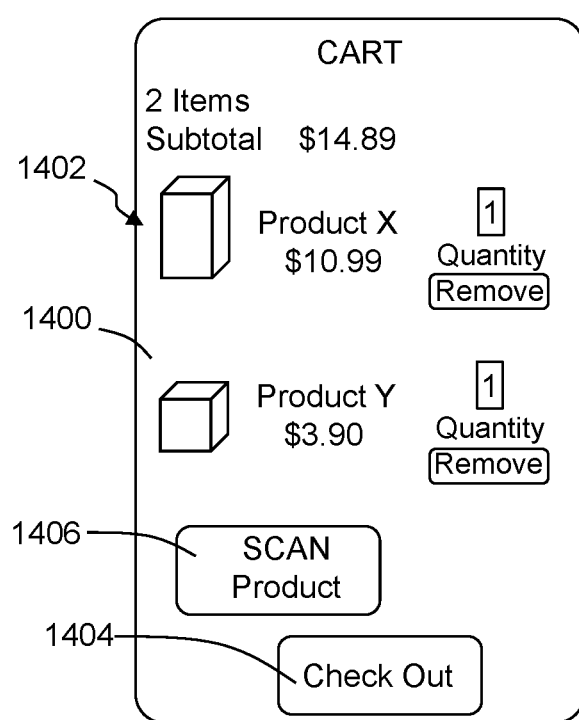
FIG. 14 illustrates an exemplary virtual cart interface in accordance with some embodiments.

In step 1104, the product is identified based on the one or more images as described above and/or other scanning methods (e.g., barcode scanning, RFID tag reading, etc.). In step 1106, the product is added to a virtual cart associated with the customer. In some instances, the product is automatically added to the virtual cart, while in other embodiments the customer is asked through the application whether to add the product to the cart. FIG. 13 illustrates an exemplary cart confirmation user interface 1300, in accordance with some embodiments. The cart confirmation user interface 1300 is configured to displays product identifying information 1302 (e.g., name, manufacturer, source, cost, tax, weight, nutritional information, other such information or a combination of such information, and/or an option to access additional information that may not be displayed on the cart confirm interface) to the customer and provides one or more options, such as an add option 1304 to add the product to the virtual cart, discard the product 1306, re-scan the product 1308, a quantity option 1310 that allows a customer to specify a quantity of the product to be added to the virtual cart and/or other such options, other such options, and typically a combination of two or more of such options. FIG. 14 illustrates an exemplary virtual cart interface 1400 in accordance with some embodiments. The virtual cart interface 1400, in some instances, is displayed following a product being added and/or in response to a customer selecting a view virtual cart option from one of the other user interfaces. The virtual cart interface 1400 can show a listing 1402 of the one or more products in the virtual cart. Some embodiments include options to adjust quantities, delete products from the virtual cart, empty the virtual cart and/or other such options. Further, some embodiments provide information about the products (e.g., name, manufacturer, quantity, weight, size, cost, other such information, a combination of two or more of such information, an option to access additional information, etc.), provide an estimated total cost, other such information, other such information, and typically a combination of such information. The virtual cart interface 1400 may further provide a checkout option 1404, scan another product 1406, and/or other such options. Other options may additionally or alternatively be available.

Figure 15:
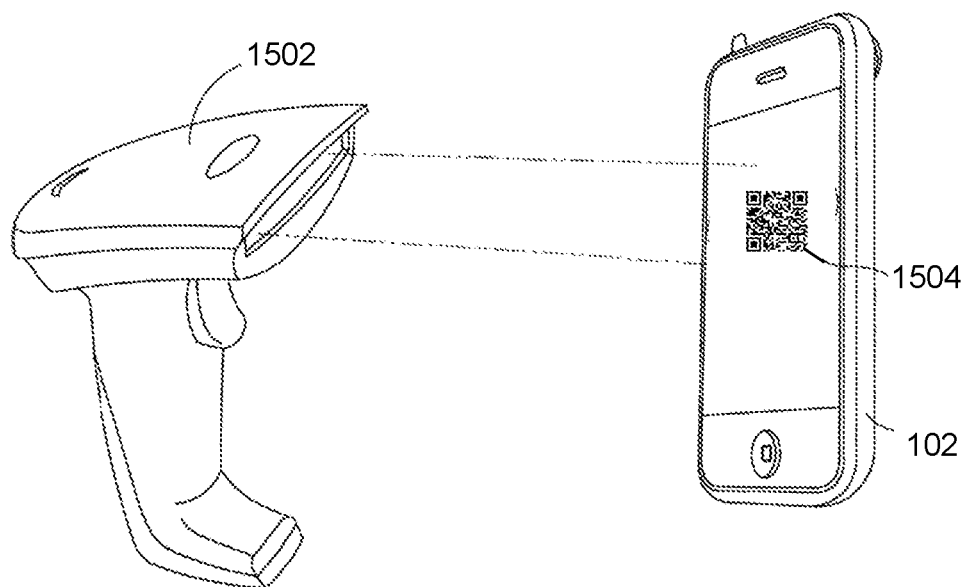
FIG. 15 illustrates of an exemplary optical scanning machine reading an optical machine-readable representation of an order displayed on a portable device, in accordance with some embodiments.

In step 1108, a checkout of the virtual cart is initiated. In some implementations, the initiation of checkout is in response to the customer activating the checkout option 1404. In other instances, the checkout may be in response to a customer moving into a certain area of the retail store (e.g., detecting a location based on location information, detecting an RFID tag, etc.). In checking out, the process obtains payment for each product within the virtual shopping cart. In some embodiments, the process 1100 includes step 1110 where the application activates a generation of an order corresponding to the virtual cart and each product included in the virtual cart. In some instances, the order is generated local on the portable device, while in other implementations the order is generated at the central server 106, a checkout system, other such system or a combination of systems. The order represents all of the products and quantities of those products within the virtual cart. Typically, an order identifier is further generated by the central server that is unique to that order. In some embodiments, optional step 1112 is implemented to dynamically generate one or more optical machine-readable representations of the order corresponding to the virtual cart. In some implementations, a single machine-readable representation is generated to represent an entire virtual cart. The optical machine-readable representation can, in some implementations, be configured to be optically scanned and/or otherwise recognized by a scanning system, such as be configured to be scanned by a scanning system associated with a point of sale system to acquire cost information of the products in the virtual cart. FIG. 15 illustrates of an exemplary optical scanning machine 1502 reading an optical machine-readable representation 1504 of an order displayed on a portable device 102, in accordance with some embodiments. In some embodiments, the optical machine-readable representation of the order is in a form of 1D barcode, such as a 1D barcode having one of the following formats: UPC-A, UPC-E, EAN-13, EAN-8, Code-128, Code-39 and ITF. Other machine readable representations can alternatively or additional be utilized.

Figure 16:
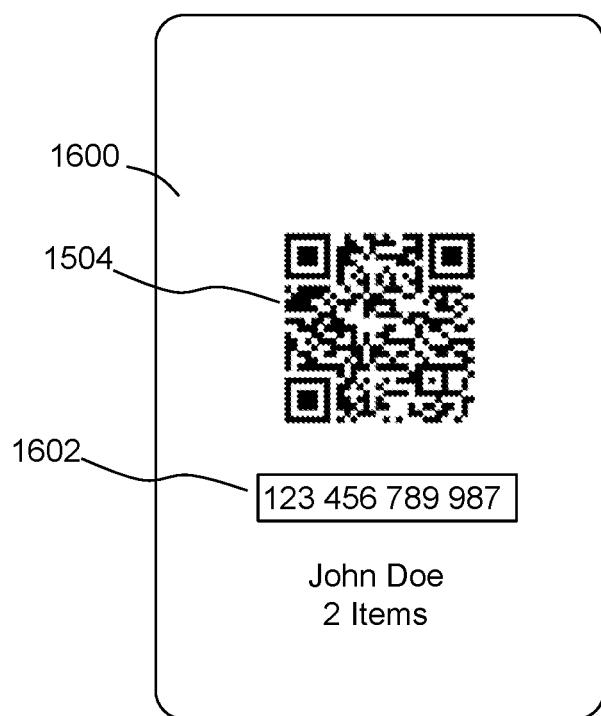
FIG. 16 illustrates an exemplary checkout screen with an exemplary machine-readable representation of the order displayed on the display of the portable device, in accordance with some embodiments.

FIG. 16 illustrates an exemplary checkout screen 1600 with an exemplary machine-readable representation 1504 of the order displayed on the display of the portable device, in accordance with some embodiments. The machine-readable representation can be a barcode, string alphanumeric of characters, other such machine-readable representation or combination of such representations. In some embodiments, a unique order number 1602 is further provided that can be used in addition to or alternatively to the machine-readable representation. The generation of the machine-readable representation may be generated in response to a customer confirming an intention to go to a traditional cashier, self-checkout station or other such system to complete the sale and pay for the products in the virtual cart (and that typically have been physically retrieved by the customer and added to a physical cart the customer is moving through the retail store as the customer shops and adds products the customer intends to purchase).

In optional step 1114 the machine-readable representation is caused to be displayed on the display of the portable device and a scanning system detects and scans the machine-readable representation. The unique identifying information can be acquired and used to get the total cost information, itemized product information, and/or other such information. For example, the point of sale system can communicate the relevant order identifier to the central server and receive total cost and/or other relevant information corresponding to the virtual cart. In optional 1116, the customer can pay for the products. The payment can be with cash, credit cart and/or other methods. In some embodiments, the point of sale system receives the unique identifier representing the order from the scanning system in response to the scanning machine system of the machine-readable representation. The identifier is used to obtain and import into the point of sale system the order using the unique identifier. The point of sale system can complete a sales transaction of each of the products in the virtual cart based on the order, and generate a confirmation of payment and/or a receipt acknowledging completion of the sales transaction.

In some embodiments, the process 1100 includes step 1120 that enables the customer to compete the purchase of the products in the virtual cart through the APP, such as by selecting a checkout option 1404 and/or selecting an electronic payment option. Accordingly, in some embodiments, the customer, in step 1120, authorizes payment for the products represented in the virtual cart. The electronic payment option enables the customer to select a type of tender and the payment method used to pay for the order. For example, the user may have the choice of providing a variety of types of tender, such as cash, credit card, direct debit from a bank, payment using an online payment service such as PayPal™ or Google Checkout, a gift card, store credit, personal check, money order, or other payment means. The user also has the choice of payment method, either transmitting payment via the portable device 102 using mobile application 104 or providing payment at either a traditional cashier or self-checkout station. In other implementations, a point of sale system 118 is activated to retrieve a method of payment (e.g., from a customer profile).

Figure 17:
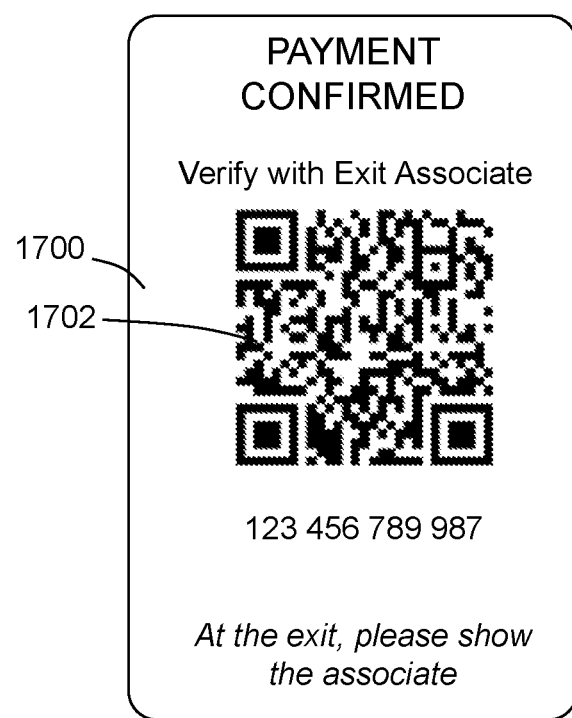
FIG. 17 illustrates an exemplary payment confirmation interface, in accordance with some embodiments.

In step 1122, a confirmation of payment is generated at the point of sale system and/or in response to the customer electronically authorizing the payment. This confirmation of payment is received at the portable device 102 and/or presented to the customer (e.g., traditional paper receipt). When electronically received at the portable device, in some implementation the confirmation of payment is configured to be displayed on a display of the portable user device to confirm payment prior to the customer leaving the first retail store. Some embodiments include optional step 1124 where some or all of the confirmation of payment is displayed on the display of the portable device 102, and this can be presented prior to exiting the retail store as a confirmation the customer paid for the products the customer is removing from the store. FIG. 17 illustrates an exemplary payment confirmation interface 1700, in accordance with some embodiments. In some instances, the payment confirmation includes a confirmation machine readable representation 1702 that can be scanned prior to the customer exiting the store as a confirmation of purchase. In some instances, a worker can view a listing of products paid for in response to scanning the confirmation machine-readable representation 1702 to allow the worker to view what products are physically present in the physical shopping cart and confirm a consistency between the physical products in the cart and the products that are confirmed as paid. The confirmation of payment interface may further provide the customer with an option to view a detailed receipt. Additionally or alternatively, a receipt confirmation may further be communicated to the portable device that can enable the customer to access information about the purchase and/or access a detailed itemization of products purchased and/or electronic receipt. Such information is typically stored in a customer profile, such as in a receipt portion of a profile, a purchase history portion of the customer profile, and/or other relevant portion.

In some embodiments, a virtual transaction is created in response to an initiation of checkout and/or payment and an order identifier can be defined or created. In some instances, an optical machine-readable representation of the order, and/or the order identifier is generated and which identifies the order. This machine readable representation can be displayed on the display of the portable device 102, wirelessly communicated to a point of sale system, or otherwise provided to the point of sale system. The optical machine-readable representation can encode a unique identifier such as an order number or a unique mobile identifier (UMI) which is associated with the portable device in order to identify the particular order. Typically, each order number, identifier and/or optical machine-readable representation generated is unique to a single particular order. Similarly, in some instances, each unique mobile identifier (UMI) is specific to a particular portable device 102, and contains information identifying that particular portable device 102, such as unique device identifier (UDID) for the portable device 102, a serial number of the portable device 102, or some other identifying information for a particular portable device 102. The optical machine-readable representation of the order represents the order and can encode identifying information or a unique identifier, which includes things such as: an order number; customer identifying information which can be used to identify a customer, such as a customer name, a customer number, and a social security number; transaction identifying information which can be used to identify a specific transaction, such as a number or other alphanumeric code; device identifying information that can identify a specific device such as a serial number or a unique device identifier (UDID) for a device such as a mobile phone or mobile computer; and any alphanumeric code or any symbol which may be used associated with and used to identify and retrieve a specific order, other such information, or a combination of two or more of such information. In some embodiments, an order number along with the optical machine-readable representation of the order is displayed on the display of the portable device 102.

The virtual shopping cart containing product identifiers and/or product information is generated or updated as products are identified through the APP and added by the user, or otherwise identified (e.g., customer manually enters identifier information). In some embodiments, the virtual shopping cart is generated by the portable device 102 and then transmitted to the central server 106 and/or one or more point of sale systems 118. In some implementations, the APP is configured to initiate communications with a point of sale system 118 (e.g., a terminal sales application that resides on the central server 106, a stand-along point of sale system in a retail store, a separate point of sale server, or the like). In other embodiments, the virtual shopping cart is generated and/or updated by the central server 106 (e.g., generated by a terminal sales application implemented by the central server) based on communications from the portable device. In some embodiments, the APP provides the user with the option to create and save a shopping list having intended to be purchased and/or having the products represented in the virtual shopping cart. The shopping list can be created any place, such as a user's home. When using the shopping list in a retail store, products may be paired up and removed from the shopping list when added to the virtual shopping cart. In some embodiments, upon retrieving product information, the central server 106 may transmit some or all of the retrieved product information to the portable device, whereupon the APP automatically generates and/or updates the virtual shopping cart containing product information representing the product and/or product identifying information.

In some embodiments, when the customer authorized and/or tendering payment, payment information is generated (e.g., by the point of sale system) and transmitted to the central server 106, inventory system 114, the APP 104 on the portable device 102, and/or other system. Typically, the virtual shopping cart in the APP and/or the central server is then marked paid and a receipt is generated by the central server 106 and/or point of sale system. The receipt is then provided to the user and/or an electronic version of the receipt is communicated to the APP on the portable device and available through the APP. In some implementations, upon generating and sending an acknowledgment that payment has been received, the central server 106 and/or the APP then changes the current virtual shopping cart into a past virtual shopping cart, retrievable by the user via an order history button and/or a customer profile. Sales transaction and receipt information may be stored on the central server 106, other customer database, and/or other storage system, and is thus accessible for a variety of purposes: including but not limited to: asset protection solutions, return validation, customer reference, and the like. Similarly, the purchase information may be used by the central server in evaluating customer preferences, inventory tracking and/or other relevant information.

When payment is authorized through electronic payment, the APP in some embodiments may debit a preregistered payment account of the user's or the user is prompted for payment account information. In some embodiments, the user may have already created a preregistered payment account with the APP, by already entering payment account information which could include, credit card information, online payment service information such as a user account name and password, store credit information, or gift card information, then the APP can debit the preregistered account and/or provide the point of sale system with the relevant payment information to be used by the point of sale system to complete the sale and obtain payment. When the user has not already created a preregistered payment account with the APP and/or the APP does not direct the point of sale system to retrieve payment information (e.g., from a customer profile), the user may in some embodiments be prompted to create a payment account by providing payment account information.

The use of the virtual cart and the purchase of products based on product identification is further described in U.S. Pat. No. 10,121,133, filed Nov. 16, 2010, U.S. patent application Ser. No. 15/956,400, filed Apr. 18, 2018, U.S. patent application Ser. No. 16/730,567, filed Dec. 30, 2019, and U.S. Provisional Patent Application No. 61/392,908, filed on Oct. 13, 2010, the contents of each is incorporated herein by reference in its entirety.

In some embodiments, systems are provided to recognize retail products in a physical retail store, comprising: a portable user device comprising: a housing; an imaging system at least partially positioned within the housing and configured to capture at least video content, wherein each video content comprising a series of frames; an image processing circuit secured within the housing and communicatively coupled with the imaging system, and the image processing circuit is configured to select and extract at least a subset of frames comprising one or more individual frames from the series of frames of a video content; at least one tangible memory positioned within the housing and storing a local product database locally storing sets of product imaging data, wherein each set of product imaging data corresponds to one of hundreds of different retail products available for sale from a retail store and comprises a product identifier and at least image attribute data exclusively corresponding to the respective product; and a decision control circuit communicatively coupled with the memory and configured to: process each frame of the subset of frames by at least a first modeling technique relative to a first image attribute and obtain a corresponding first product identification probability that an item, captured within each of the subset of frames, is estimated to be a first product of the hundreds of products; process each frame of the subset of frames by a second modeling technique relative to a second image attribute that is different than the first attribute, and obtain corresponding second product identification probability that the item, captured within each of the subset of frames, is estimated to be the first product of the hundreds of products; determine an aggregated first identification probability of the first product as a function of the first product identification probabilities corresponding to the frames of the subset of frames; determine an aggregated second identification probability of the first product as a function of the second product identification probabilities corresponding to the frames of the subset of frames; collectively evaluate the aggregated first identification probability and the aggregated second identification probability of the first product for the frames of the subset of frames and identify when one or more of the aggregated first identification probability and the aggregated second identification probability has a predefined relationship with a collective threshold probability; and cause an image of the first product to be displayed in response to identifying that one or more of the aggregated first identification probability and the aggregated second identification probability has the predefined relationship with the collective threshold probability.

Some embodiments provide methods to recognize retail products in a physical retail store, comprising: receiving one or more video content, wherein each video content comprising a series of frames; extracting at least a subset of frames from a video content, wherein the subset of frames comprises one or more individual frames from the series of frames of the video content; processing each frame of the subset of frames by at least a first modeling technique relative to a first image attribute and obtaining a corresponding first product identification probability that an item, captured within each of the subset of frames, is estimated to be a first product of the hundreds of products; processing each frame of the subset of frames by a second modeling technique relative to a second image attribute that is different than the first attribute and obtaining corresponding second product identification probabilities that the item, captured within each of the subset of frames, is estimated to be the first product of the hundreds of products; determining an aggregated first identification probability of the first product as a function of the first product identification probabilities corresponding to the frames of the subset of frames; determining an aggregated second identification probability of the first product as a function of the second product identification probabilities corresponding to the frames of the subset of frames; collectively evaluating the aggregated first identification probability and the aggregated second identification probability of the first product for the frames of the subset of frames and identify when one or more of the aggregated first identification probability and the aggregated second identification probability has a predefined relationship with a collective threshold probability; and causing an image of the first product to be displayed in response to identifying that one or more of the aggregated first identification probability and the aggregated second identification probability has the predefined relationship with the collective threshold probability.

Some embodiments provide systems to recognize retail products in a physical retail store. These systems comprise: a customer database storing, for each of a plurality of customers of a retail company operating at least a first retail store, a customer profile storing one or more of purchase history information, product search history information, and product preference data; a retail product database storing product data comprising product imaging data corresponding to each of tens of thousands of different retail products available for sale from the first retail store, wherein each of the imaging data corresponding to one of the different retail products and comprises a corresponding product identifier and at least image attribute data exclusively corresponding to the respective product; and a model training system communicatively coupled with the product database, wherein the modeling training system comprises a training control circuit communicatively coupled with tangible memory storing a rules database maintaining rules and code that is when executed by the training control circuit cause the training control circuit, for each of the plurality of customers, to: identify a first customer of the plurality of customers; access, in the customer database, a first customer profile associated with the first customer; access the rules database and obtain a first set of one or more filtering rules, and apply the first set of one or more filtering rules to the product database based on each of the purchase history information, the search history information, and the product preference data corresponding to the first customer; generate, based on a result of filtering the product database, a first listing of products specific to the first customer, wherein the first listing comprises a first subset of tens of retail products, of the tens of thousands of retail products, that the customer is predicted to attempt to identify one or more of the first subset of tens of retail products through image recognition implemented on a portable user device associated with the first customer; access a second set of model training rules and apply the second set of model training rules to train a machine learning model to be applied by the portable user device in identifying one or more products from frames of video content captured by the portable user device, wherein the training is limited to the first listing of products and corresponding image data for each of the products in the first listing of products; and communicate the trained machine learning model to the portable user device associated with the first customer.

In some embodiments, the portable user device further comprises a portable device control circuit coupled with the memory and configured to: add the first product to a virtual cart; and initiate a checkout of and payment for each product within the virtual shopping cart. The control circuit, in some implementations, in initiating the checkout of the virtual cart activates a generation at a central server of an order corresponding to the virtual cart and each product included in the virtual cart, obtain a dynamically generated optical machine-readable representation of the order corresponding to the virtual cart, wherein the optical machine-readable representation of the order is configured to be scanned by a scanning system associated with a point of sale system to acquire cost information of the products in the virtual cart. In some embodiments, the control circuit in initiating the checkout of the virtual cart activates a generation at a central server of an order corresponding to the virtual cart and each product included in the virtual cart, authorize payment for the products represented in the virtual cart, and receive a confirmation of payment at the portable user device, wherein the confirmation of payment is configured to be displayed on a display of the portable user device to confirm payment prior to the customer leaving the first retail store.

Some embodiments add the first product to a virtual cart on the portable user device; initiate a checkout of the virtual shopping cart; and obtain a dynamically generated optical machine-readable representation of an order corresponding to the virtual cart and each product included in the virtual cart, and display on a display of the portable user device the machine-readable representation of the order to be scanned by scanning system associated with a point of sale system, wherein the machine-readable representation of the order encodes a dynamically generated unique identifier representing the order. The point-of-sale terminal is included in some embodiments and is operatively coupled to the scanning system, wherein the point-of sale terminal is configured to (i) receive the unique identifier representing the order from the scanning system in response to the scanning system scanning of the machine-readable representation, (ii) obtain and importing into the point of sale system the order using the unique identifier, (iii) complete a sales transaction of each of the products in the virtual cart based on the order, and (vi) generate a receipt acknowledging completion of the sales transaction.

Further, some embodiments provide methods of recognizing retail products in a physical retail store, comprising: by a model training system communicatively coupled with a product database and a customer database: identifying a first customer of the plurality of customers; accessing, in the customer database, a first customer profile associated with the first customer; accessing a rules database and obtain a first set of one or more filtering rules, and applying the first set of one or more filtering rules to the product database based on each of a purchase history information, search history information, and product preference data corresponding to the first customer; generating, based on a result of filtering the product database, a first listing of products specific to the first customer, wherein the first listing comprises a first subset of tens of retail products, of the tens of thousands of retail products, that the customer is predicted to attempt to identify through image recognition implemented on a portable user device associated with the first customer; accessing a second set of model training rules, applying the second set of model training rules, and training a machine learning model to be applied by the portable user device in identifying one or more products from frames of video content captured by the portable user device, wherein the training is limited to the first listing of products and corresponding image data for each of the products in the first listing of products; and communicating the trained machine learning model to the portable user device associated with the first customer.

In some embodiments a method comprises automatically adding the first product to a virtual cart on the portable user device; initiating a checkout of the virtual shopping cart; and obtaining a dynamically generated optical machine-readable representation of an order corresponding to the virtual cart and each product included in the virtual cart, and displaying on a display of the portable user device the machine-readable representation of the order to be scanned by a scanning system associated with a point of sale system, wherein the machine-readable representation of the order encodes a dynamically generated unique identifier representing the order. Further, some embodiments comprise: receiving, at a point of sale terminal, the unique identifier representing the order from the scanning system in response to the scanning system scanning of the machine-readable representation; obtaining and importing into the point of sale system the order using the unique identifier; completing a sales transaction of each of the products in the virtual cart based on the order; and generating a receipt acknowledging completion of the sales transaction.

Product vectorized characterizations and customer partiality vectors and their correlation are described in U.S. patent application Ser. No. 15/487,538 filed on Apr. 14, 2017; Ser. No. 15/487,728 filed on Apr. 14, 2017; Ser. No. 15/487,760 filed on Apr. 14, 2017; Ser. No. 15/487,775 filed on Apr. 14, 2017; Ser. No. 15/487,792 filed on Apr. 14, 2017; Ser. No. 15/487,826 filed on Apr. 14, 2017; Ser. No. 15/487,882 filed on Apr. 14, 2017; Ser. No. 15/487,894 filed on Apr. 14, 2017; Ser. No. 15/488,004 filed on Apr. 14, 2017; Ser. No. 15/488,015 filed on Apr. 14, 2017; Ser. No. 15/488,107 filed on Apr. 14, 2017; Ser. No. 15/606,602 filed on May 26, 2017; Ser. No. 15/624,030 filed on Jun. 15, 2017; Ser. No. 15/625,599 filed on Jun. 16, 2017; Ser. No. 15/628,282 filed on Jun. 20, 2017; Ser. No. 15/634,862 filed on Jun. 27, 2017; Ser. No. 15/655,339 filed on Jul. 20, 2017; Ser. No. 15/669,546 filed on Aug. 4, 2017; Ser. No. 15/678,608 filed on Aug. 16, 2017; Ser. No. 15/685,981 filed on Aug. 24, 2017; Ser. No. 15/704,878 filed on Sep. 14, 2017; Ser. No. 15/782,509 filed on Oct. 12, 2017; Ser. No. 15/782,555 filed on Oct. 12, 2017; Ser. No. 15/782,559 filed on Oct. 12, 2017; Ser. No. 15/783,220 filed on Oct. 13, 2017; Ser. No. 15/783,313 filed on Oct. 13, 2017; Ser. No. 15/783,453 filed on Oct. 13, 2017; Ser. No. 15/783,551 filed on Oct. 13, 2017; Ser. No. 15/783,555 filed on Oct. 13, 2017; Ser. No. 15/783,645 filed on Oct. 13, 2017; Ser. No. 15/783,668 filed on Oct. 13, 2017; Ser. No. 15/783,787 filed on Oct. 13, 2017; Ser. No. 15/783,825 filed on Oct. 13, 2017; Ser. No. 15/783,929 filed on Oct. 13, 2017; Ser. No. 15/783,960 filed on Oct. 13, 2017; Ser. No. 15/921,540 filed on Mar. 14, 2018; Ser. No. 15/939,788 filed on Mar. 29, 2018; Ser. No. 15/947,380 filed on Apr. 6, 2018; Ser. No. 15/952,494 filed on Apr. 13, 2018; and Ser. No. 15/953,113 filed on Apr. 13, 2018; each of which is incorporated herein by reference in its entirety.

Further, the subject application relates to U.S. Provisional Application No. 62/809,851 filed on Feb. 25, 2019, which is incorporated herein by reference in its entirety.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system to recognize retail products in a physical retail store, comprising:
   a customer database storing, for each of a plurality of customers of a retail company operating at least a first retail store, a customer profile storing one or more of purchase history information, product search history information, and product preference data;
   a retail product database storing product data comprising product imaging data corresponding to each of tens of thousands of different retail products available for sale from the first retail store, wherein each of the imaging data corresponding to one of the different retail products and comprises a corresponding product identifier and at least image attribute data exclusively corresponding to the respective product; and
   a model training system communicatively coupled with the product database, wherein the modeling training system comprises a training control circuit communicatively coupled with tangible memory storing a rules database maintaining rules and code that is when executed by the training control circuit cause the training control circuit, for each of the plurality of customers, to:
   identify a first customer of the plurality of customers;

access, in the customer database, a first customer profile associated with the first customer;

access the rules database and obtain a first set of one or more filtering rules, and apply the first set of one or more filtering rules to filter the products identified in the product database based on each of the purchase history information, the search history information, and the product preference data corresponding to the first customer;

generate, based on a result of filtering the product database, a first listing of products specific to the first customer, wherein the first listing comprises a first subset of tens of retail products, of the tens of thousands of retail products, that the customer is predicted to attempt to identify one or more of the first subset of tens of retail products through image recognition implemented on a portable user device associated with the first customer;

access a second set of model training rules and apply the second set of model training rules to train a machine learning model to be applied by the portable user device in identifying one or more products from frames of video content captured by the portable user device, wherein the training is limited to the first listing of products and corresponding image data for each of the products in the first listing of products; and communicate the trained machine learning model to the portable user device associated with the first customer.

2. The system of claim 1, wherein the model training system is further configured to repeatedly update and retrain, over time, the machine learning model; and communicate the retrained machine learning model to the portable user device associated with the first customer to replace a previously stored trained machine learning model on the portable user device.

3. The system of claim 2, wherein the model training system, in repeatedly updating and retraining the machine learning model, is configured to:

reapply, over time, the first set of filtering rules to the product database based on updates to one or more of the purchase history information, the search history information, and the product preference data corresponding to the first customer;

generate, based on a result of reapplying the first set of filtering rules, an updated first listing of products specific to the first customer; and access the second set of model training rules and reapply the second set of model training rules to retrain the machine learning model, wherein the retraining is limited to the updated first listing of products.

4. The system of claim 2, wherein the model training system, in repeatedly updating and retraining the machine learning model, is configured to initiate the retraining in response to a modification to one of the purchase history information, the search history information, and the product preference data corresponding to the first customer.

5. The system of claim 2, wherein the model training system, in repeatedly updating and retraining the machine learning model, is configured to initiate the retraining in response to receiving a notification that the portable user device associated with the first customer is within a geographic threshold of a second retail store that is at a second geographic location that is different than a first geographic location of the first retail store;

update the first listing of products to include a second subset of products, wherein the second subset of products comprises products relevant to at least one of the second retail store and the geographic location of the second retail store; and wherein the retraining the machine learning model is limited to the updated first listing of products including the second subset of products.

6. The system of claim 1, wherein the model training system, in generating the first listing of products specific to the first customer, is configured to identify, for multiple products identified based on the result of filtering the product database, a corresponding product category comprising a set of a plurality of similar products defined as being part of the product category, and include two or more products from each of the product categories into the first listing of products specific to the first customer.

7. The system of claim 6, wherein the model training system, in repeatedly updating and retraining the machine learning model, is configured to identify that a first product, which was included in the most recent updated first listing of products, has not been purchased by the first customer within a threshold purchase period of time; and update the first listing of products to exclude the first product from the updated first listing of products in response to identifying that the first product has not been purchased by the first customer within the threshold purchase period of time; and wherein the retraining the machine learning model is limited to the updated first listing of products excluding the first product.

8. The system of claim 1, wherein the model training system is configured to:

receive a notification from the portable user device associated with the customer identifying a version of a stored machine learning model presently stored on the portable user device;

determine that the version of the stored machine learning model is not the most recently updated version of the machine learning model; and cause the communication of the most recently updated version of the trained machine learning model to the portable user device.

9. The system of claim 1, further comprising:

the portable user device associated with the first customer, wherein the portable user device comprises:

an imaging system configured to capture at least video content, wherein each video content comprising a series of frames;

at least one tangible memory positioned within the housing and storing the trained machine learning model, and a local product database locally storing sets of product imaging data, wherein each set of product imaging data corresponds to one of the first subset of tens of retail products available for sale and comprises a product identifier and at least image attribute data exclusively corresponding to the respective product; and a decision control circuit communicatively coupled with the memory and configured to:

process each frame of a subset of one or more frames of the video content by at least a first modeling technique implemented by the trained machine learning model relative to a first image attribute and obtain a corresponding first product identification probability that an item, captured within each of the subset of at least one frame, is estimated to be a first product of the first subset of tens of retail products; process each frame of the subset of at least one frame by a second modeling technique implemented by the trained machine learning model relative to a second image attribute that is different than the first attribute, and obtain corresponding second product identification probability that the item, captured within each of the subset of at least one frame, is estimated to be the first product of the first subset of tens of retail products; determine an aggregated first identification probability of the first product as a function of the first product identification probabilities corresponding to the frames of the subset of at least one frame; determine an aggregated second identification probability of the first product as a function of the second product identification probabilities corresponding to the frames of the subset of at least one frame; collectively evaluate the aggregated first identification probability and the aggregated second identification probability of the first product for the frames of the subset of at least one frame and identify when one or more of the aggregated first identification probability and the aggregated second identification probability has a predefined relationship with a collective threshold probability; and cause an image of the first product to be displayed in response to identifying that one or more of the aggregated first identification probability and the aggregated second identification probability has the predefined relationship with the collective threshold probability.

10. The system of claim 8, wherein the portable user device further comprising a control circuit coupled with the memory and configured to:
add the first product to a virtual cart; and
initiate a checkout of and payment for each product within the virtual shopping cart.

11. The system of claim 10, wherein the control circuit in initiating the checkout of the virtual cart activates a generation at a central server of an order corresponding to the virtual cart and each product included in the virtual cart, obtain a dynamically generated optical machine-readable representation of the order corresponding to the virtual cart, wherein the optical machine-readable representation of the order is configured to be scanned by a scanning system associated with a point of sale system to acquire cost information of the products in the virtual cart.

12. The system of claim 10, wherein the control circuit in initiating the checkout of the virtual cart activates a generation at a central server of an order corresponding to the virtual cart and each product included in the virtual cart, authorize payment for the products represented in the virtual cart, and receive a confirmation of payment at the portable user device, wherein the confirmation of payment is configured to be displayed on a display of the portable user device to confirm payment prior to the customer leaving the first retail store.

13. The system of claim 1, wherein the model training system, in applying the first set of one or more filtering rules and filtering the products identified in the product database is further configured to apply the first set of one or more filtering rules and filter the products identified in the product database further based on one or more of a location of the first retail store, rates of sales of one or more of the products at the first retail store, and inventory levels of one or more of the products at the first retail store.

14. A method of recognizing retail products in a physical retail store, comprising:
by a model training system communicatively coupled with a product database and a customer database:
identifying a first customer of the plurality of customers;
accessing, in the customer database, a first customer profile associated with the first customer;
accessing a rules database and obtain a first set of one or more filtering rules, and applying the first set of one or more filtering rules filtering the products identified in the product database based on each of a purchase history information, search history information, and product preference data corresponding to the first customer;
generating, based on a result of filtering the product database, a first listing of products specific to the first customer, wherein the first listing comprises a first subset of tens of retail products, of the tens of thousands of retail products, that the customer is predicted to attempt to identify through image recognition implemented on a portable user device associated with the first customer;
accessing a second set of model training rules, applying the second set of model training rules, and training a machine learning model to be applied by the portable user device in identifying one or more products from frames of video content captured by the portable user device, wherein the training is limited to the first listing of products and corresponding image data for each of the products in the first listing of products; and
communicating the trained machine learning model to the portable user device associated with the first customer.

15. The method of claim 14, further comprising:
repeatedly updating and retraining, over time, the machine learning model; and
communicating the retrained machine learning model to the portable user device associated with the first customer to replace a previously stored trained machine learning model on the portable user device.

16. The method of claim 15, wherein the repeatedly updating and retraining the machine learning model, comprises:
reapplying, over time, the first set of filtering rules to the product database based on updates to one or more of the purchase history information, the search history information, and the product preference data corresponding to the first customer;
generating, based on a result of reapplying the first set of filtering rules, an updated first listing of products specific to the first customer; and
accessing the second set of model training rules, reapplying the second set of model training rules, and retraining the machine learning model, wherein the retraining is limited to the updated first listing of products.

17. The method of claim 15, wherein the repeatedly updating and retraining the machine learning model comprises:
initiating the retraining in response to a modification to one of the purchase history information, the search history information, and the product preference data corresponding to the first customer.

18. The method of claim 15, wherein the repeatedly updating and retraining the machine learning model comprises:
initiating the retraining in response to receiving a notification that the portable user device associated with the first customer is within a geographic threshold of a second retail store that is at a second geographic location that is different than a first geographic location of the first retail store; and
updating the first listing of products to include a second subset of products, wherein the second subset of products comprises products relevant to at least one of the second retail store and the geographic location of the second retail store; and wherein the retraining the machine learning model is limited to the updated first listing of products including the second subset of products.

19. The method of claim 14, wherein the generating the first listing of products specific to the first customer comprises:

identifying, for multiple products identified based on the result of filtering the product database, a corresponding product category comprising a set of a plurality of similar products defined as being part of the product category; and including two or more products from each of the product categories into the first listing of products specific to the first customer.

20. The method of claim 19, wherein the repeatedly updating and retraining the machine learning model comprises:

identifying that a first product, which was included in the most recent updated first listing of products, has not been purchased by the first customer within a threshold purchase period of time; and updating the first listing of products to exclude the first product from the updated first listing of products in response to identifying that the first product has not been purchased by the first customer within the threshold purchase period of time; and wherein the retraining the machine learning model is limited to the updated first listing of products excluding the first product.

21. The method of claim 14, further comprising:

receiving a notification from the portable user device associated with the customer identifying a version of a stored machine learning model presently stored on the portable user device;

determining that the version of the stored machine learning model is not the most recently updated version of the machine learning model; and causing the communication of the most recently updated version of the trained machine learning model to the portable user device.

22. The method of claim 14, comprising:

by a decision control circuit of the portable user device:

processing each frame of a subset of one or more frames of a video content, captured by an imaging system of the portable use device, by at least a first modeling technique implemented by the trained machine learning model relative to a first image attribute and obtaining a corresponding first product identification probability that an item, captured within each of the subset of at least one frame, is estimated to be a first product of the first subset of tens of retail products;

processing each frame of the subset of at least one frame by a second modeling technique implemented by the trained machine learning model relative to a second image attribute that is different than the first attribute, and obtaining corresponding second product identification probability that the item, captured within each of the subset of at least one frame, is estimated to be the first product of the first subset of tens of retail products;

determining an aggregated first identification probability of the first product as a function of the first product identification probabilities corresponding to the frames of the subset of at least one frame;

determining an aggregated second identification probability of the first product as a function of the second product identification probabilities corresponding to the frames of the subset of at least one frame;

collectively evaluating the aggregated first identification probability and the aggregated second identification probability of the first product for the frames of the subset of at least one frame and identifying when one or more of the aggregated first identification probability and the aggregated second identification probability has a predefined relationship with a collective threshold probability; and causing an image of the first product to be displayed in response to identifying that one or more of the aggregated first identification probability and the aggregated second identification probability has the predefined relationship with the collective threshold probability.

* * * * *

UNITED STATES PATENT AND TRADEMARK OFFICE
CERTIFICATE OF CORRECTION

PATENT NO. : 10,990,950 B2  
APPLICATION NO. : 16/800370  
DATED : April 27, 2021  
INVENTOR(S) : Michael A. Garner et al.

Page 1 of 1

It is certified that error appears in the above-identified patent and that said Letters Patent is hereby corrected as shown below:

In the Claims

At Column 58, Line 5, Claim 22, delete "use" and replace with --user-- before "device".

Signed and Sealed this  
Second Day of November, 2021

Drew Hirshfeld  
*Performing the Functions and Duties of the*  
*Under Secretary of Commerce for Intellectual Property and*  
*Director of the United States Patent and Trademark Office*